(12) United States Patent
Matsuzaki

(10) Patent No.: US 8,014,233 B2
(45) Date of Patent: Sep. 6, 2011

(54) SATELLITE SIGNAL RECEPTION DEVICE, TIMEKEEPING DEVICE, AND SATELLITE SIGNAL RECEPTION METHOD FOR A SATELLITE SIGNAL RECEPTION DEVICE

(75) Inventor: Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 544 days.

(21) Appl. No.: 12/262,763

(22) Filed: Oct. 31, 2008

(65) Prior Publication Data
US 2009/0135674 A1    May 28, 2009

(30) Foreign Application Priority Data
Nov. 22, 2007   (JP) ................................ 2007-303265

(51) Int. Cl.
*G04C 11/02*    (2006.01)
*G01S 19/24*    (2010.01)
*G01S 19/34*    (2010.01)
(52) U.S. Cl. ................. 368/47; 342/357.63; 342/357.74
(58) Field of Classification Search .................... 368/47; 342/357.62, 357.63, 357.65, 357.67, 357.74
See application file for complete search history.

(56) References Cited

U.S. PATENT DOCUMENTS

| | | | |
|---|---|---|---|
| 6,212,133 B1 | 4/2001 | McCoy et al. | |
| 6,346,911 B1 * | 2/2002 | King | 342/357.62 |
| 6,694,276 B2 | 2/2004 | Farine et al. | |
| 7,266,140 B1 * | 9/2007 | Hasegawa et al. | 375/130 |
| 7,436,357 B2 * | 10/2008 | Wang et al. | 342/357.74 |
| 7,447,253 B2 * | 11/2008 | Abraham et al. | 375/145 |
| 7,474,594 B2 * | 1/2009 | Urano et al. | 368/47 |
| 7,920,441 B2 * | 4/2011 | Rostrom | 368/47 |
| 7,936,642 B1 * | 5/2011 | Wang et al. | 368/47 |
| 2002/0004392 A1 | 1/2002 | Farine et al. | |
| 2003/0083814 A1 * | 5/2003 | Gronemeyer | 701/213 |
| 2003/0104849 A1 | 6/2003 | Arimitsu | |
| 2007/0004469 A1 | 1/2007 | Arimitsu | |
| 2007/0194923 A1 | 8/2007 | Karr | |
| 2007/0247356 A1 * | 10/2007 | Chen | 342/357.06 |

FOREIGN PATENT DOCUMENTS

| | | |
|---|---|---|
| CN | 1431790 | 7/2003 |
| EP | 1 170 598 A1 | 1/2002 |
| JP | 10-010251 | 1/1998 |
| JP | 2001-074494 | 3/2001 |
| JP | 2001-091625 | 4/2001 |
| JP | 2002-071783 | 3/2002 |
| JP | 2003-330570 | 11/2003 |
| JP | 2006-194697 | 7/2006 |
| JP | 2007-271536 | 10/2007 |

* cited by examiner

*Primary Examiner* — Vit Miska

(57) ABSTRACT

A satellite signal reception device having a reception unit that captures a positioning information satellite and receives a satellite signal transmitted from the captured positioning information satellite; a data acquisition unit that can acquire time information and positioning information based on the satellite signal received by the reception unit; and a reception mode control unit that controls the reception mode of the reception unit to at least one of a time information reception mode and positioning information reception mode. The reception unit includes a correlation unit that determines a correlation between a code used for capturing the satellite signal and the received satellite signal. The data acquisition unit includes an operating unit that decodes the received data. The reception mode control unit includes a clock control unit that separately controls the operating clock of the correlation unit and the process clock of the operating unit according to the reception mode.

12 Claims, 11 Drawing Sheets

SATELLITE SIGNAL RECEPTION DEVICE, TIMEKEEPING DEVICE, AND SATELLITE SIGNAL RECEPTION METHOD FOR A SATELLITE SIGNAL RECEPTION DEVICE

CROSS-REFERENCE TO RELATED APPLICATIONS

Japanese Patent application No. 2007-303265, is hereby incorporated by reference in its entirety.

BACKGROUND

1. Field of Invention

The present invention relates to a satellite signal reception device that receives radio signals transmitted from a positioning information satellite such as a GPS satellite to acquire the current date and time, to a timepiece that has this satellite signal reception device, and to satellite signal reception method for the satellite signal reception device.

2. Description of Related Art

The Global Positioning System (GPS), which is a system for determining the position of a GPS receiver, uses GPS satellites that circle the Earth on known orbits, and each GPS satellite has an atomic clock on board. Each GPS satellite therefore keeps the time (referred to below as the GPS time or satellite time information) with extremely high precision.

A radio-controlled timepiece that adjusts the time using time information (GPS time) from GPS satellites is taught, for example, in Japanese Unexamined Patent Appl. Pub. JP-A-H10-10251.

The signals (navigation message) from the GPS satellites are transmitted in frames and subframes synchronized to a Coarse Acquisition code (C/A code) that is reset at the beginning of the week of the GPS time. If the navigation message is interpreted using this C/A code, the time passed since the beginning of the GPS time week can be known from the signal from a single satellite, and the time can be set to a precision of approximately 0.1 second.

More specifically, the GPS satellites orbit at an altitude of approximately 20,000-27,000 km. It therefore takes approximately 66.6-90 ms for signals to travel from the GPS satellite to the GPS receiver. By correcting for this transmission time, the time can be synchronized to the Coordinated Universal Time (UTC) with error on the millisecond order, and a timepiece with sufficient practical precision can be achieved.

Hardware and products designed to receive and process satellite signals for both adjusting the time and positioning require a CPU and correlator operating at a high clock rate in order to complete the positioning calculations in a prescribed time. This hardware configuration is more than what is needed to simply adjust the time, however.

If the CPU and correlator run at a high clock rate when adjusting the time, an operation that is used more frequently than the positioning function, the peak current also rises. This can lead to an excessive voltage drop causing the system to shut down. If the voltage drops significantly due to an increase in the peak current, the charge/discharge cycle repeats more frequently, the battery therefore deteriorates more quickly, and the battery life is shortened. One possible solution is to increase the size of the battery, but this also increases the size of the satellite signal reception device and makes incorporating a satellite signal reception device in a wristwatch or other mobile device difficult.

SUMMARY OF INVENTION

A satellite signal reception device, a timekeeping device, and a satellite signal reception method for a satellite signal reception device enable controlling the peak current, thereby increasing battery life and reducing battery size, and avoiding system shutdowns caused by a voltage drop.

A first aspect of the invention is a satellite signal reception device having a reception unit that captures a positioning information satellite and receives a satellite signal transmitted from the captured positioning information satellite; a data acquisition unit that can acquire time information and positioning information based on the satellite signal received by the reception unit; and a reception mode control unit that controls the reception mode of the reception unit to at least one of a time information reception mode and positioning information reception mode. The reception unit includes a correlation unit that determines a correlation between a code used for capturing the satellite signal and the received satellite signal; the data acquisition unit includes an operating unit that decodes the received data; and the reception mode control unit includes a clock control unit that separately controls the operating clock of the correlation unit and the process clock of the operating unit according to the reception mode.

The clock control unit in this aspect of the invention can separately control the operating clock of the correlation unit and the process clock of the operating unit, and can therefore switch the clocks to a fast clock rate or slow clock rate according to the reception mode.

For example, in the time information reception mode acquiring time information from a satellite signal, the amount of data to be decoded is small compared with the positioning information reception mode that acquires positioning information (location information) from the satellite signal. As a result, the process clock of the operating unit when in the time information reception mode can be set slower than the process clock of the operating unit in the positioning information reception mode and data can still be processed with sufficient speed. Therefore, if the clock control unit sets the process clock of the operating unit to a low clock rate when in the time information reception mode, and switches to a high clock rate in the positioning information reception mode, the peak current can be reduced in the time information reception mode compared with always processing data at the high clock rate.

Furthermore, because the amount of data is small and the data is repeatedly transmitted in a short time in the time information reception mode, the satellite signal can be captured and received in a good reception environment even if the operating clock of the correlation unit is slow. However, when the reception environment is not particularly good, the satellite signal can be quickly captured and received by setting the operating clock of the operating unit to the high clock rate even in the time information reception mode.

As a result, if the time information is received manually by the user, for example, a good reception environment can be expected, such as the satellite signal reception device being outdoors and stationary, and the clock control unit can control the operating clock of the correlation unit to the low clock rate. The peak current can therefore be reduced compared with always setting the operating clock of the correlation unit to the high clock rate.

Because the clock control unit in this aspect of the invention controls the clock rate of the correlation unit and operating unit according to the reception mode, the clocks can be controlled to the slowest speed required in the reception mode, and peak current can be suppressed. Furthermore, because the clock is set slow when in a reception mode that can receive the satellite signal at a slow clock rate, the reception success rate does not drop.

Therefore, the satellite signal reception device according to this aspect of the invention can increase battery life, reduce battery size, and avoid system shutdowns caused by a voltage drop. The invention is therefore particularly well suited to use in mobile electronic devices such as wristwatches and cell phones.

Preferably, the clock control unit can switch the process clock of the operating unit between at least a first process clock and a second process clock that is faster than the first process clock, sets the process clock of the operating unit to the first process clock when the time information reception mode is selected as the reception mode, and sets the process clock of the operating unit to the second process clock when the positioning information reception mode is selected as the reception mode.

In the time information reception mode the amount of data to be decoded is less than in the positioning information reception mode, and can therefore be sufficiently decoded even if the process clock of the operating unit is set to the slower first process clock. Because the amount of data to be decoded in the positioning information reception mode is large, however, processing time can be shortened by setting the process clock of the operating unit to the high speed second process clock.

If the clock control unit thus switches the process clock of the operating unit to a slow clock in the time information reception mode and a fast clock in the positioning information reception mode, the data can be reliably processed and the peak current can be reduced compared with operating at a high clock rate in the time information reception mode.

The actual rate of the first process clock and the second process clock can be set desirably according to the application. For example, the second process clock is preferably two to six times faster than the first process clock. In a preferred aspect of the invention the first process clock is set to 12 MHz and the second process clock is set to 48 MHz.

Yet further preferably, the reception mode control unit can select a manual time information reception mode that receives time information based on a manual operation, or an automatic time information reception mode that receives time information automatically, as the time information reception mode. The clock control unit can switch the operating clock of the correlation unit between at least a first operating clock and a second operating clock that is faster than the first operating clock, sets the operating clock of the correlation unit to the first operating clock and sets the process clock of the operating unit to the first process clock when the manual time information reception mode is selected as the reception mode, and sets the operating clock of the correlation unit to the second operating clock and sets the process clock of the operating unit to the first process clock when the automatic time information reception mode is selected as the reception mode.

By setting the operating clock of the correlation unit to the first operating clock in the manual time information reception mode, this aspect of the invention reduces the peak current compared with driving the correlation unit at the second operating clock, which is faster than the first operating clock.

When reception is manually initiated, the user is usually located where satellite signals can be easily received from the positioning information satellites, or more particularly outdoors where the satellite signals can be received directly from the positioning information satellites with the satellite signal reception device motionless. Because the reception environment is thus good, the possibility of successfully synchronizing with and receiving the satellite signal is increased even if the operating clock of the correlation unit is set slow.

In the automatic time information reception mode, however, the reception environment of the satellite signal reception device is unpredictable. The satellite signal reception device could be indoors or it could be worn by the user and outdoors but moving. The signal strength of the satellite signal reaching the satellite signal reception device may therefore be weak, or the captured positioning information satellite may be hidden from view by a building and lost while the user moves around, or the reception environment could be poor for other reasons. By setting the operating clock of the correlation unit high in this situation, the satellite signal can be quickly captured and synchronized, and the possibility of successfully receiving the satellite signal can be increased compared with using a slow operating clock.

By thus switching the operating clock of the correlation unit to a high or low clock rate according to whether the time information reception mode is manual or automatic, this aspect of the invention can suppress the peak current, extend the battery life and reduce the battery size, and prevent system shutdowns caused by a voltage drop without lowering the success rate of the reception process.

The actual rate of the first operating clock and the second operating clock can be set desirably according to the application. For example, the second operating clock is preferably two to six times faster than the first operating clock. In a preferred aspect of the invention the first operating clock is set to 15 MHz and the second operating clock is set to 30 MHz.

The first operating clock and the first process clock may also be the same speed or different speeds. The second operating clock and second process clock may also be the same speed or different speeds. If the first operating clock and first process clock are the same speed and the second operating clock and the second process clock are the same speed, the number of clock signals generated is reduced and the clock generator circuit can be simplified.

In another aspect of the invention the reception mode control unit can select an indoor time information reception mode for acquiring time information when indoors, a mobile time information reception mode for acquiring time information when outdoors and moving, and an outdoor stationary time information reception mode for acquiring time information when outdoors and not moving, as the time information reception mode; and the clock control unit can switch the operating clock of the correlation unit between at least a first operating clock and a second operating clock that is faster than the first operating clock, sets the operating clock of the correlation unit to the second operating clock and sets the process clock of the operating unit to the first process clock when the indoor time information reception mode or the mobile time information reception mode is selected as the reception mode, and sets the operating clock of the correlation unit to the first operating clock and sets the process clock of the operating unit to the first process clock when the outdoor stationary time information reception mode is selected as the reception mode.

In this aspect of the invention the operating clock of the correlation unit is set to the first operating clock when in the outdoor stationary time information reception mode, and the peak current can be reduced compared with operating at the second operating clock, is faster than the first operating clock.

In addition, when in the outdoor stationary time information reception mode, the satellite signal reception device is outdoors and not moving, and is therefore in a good environment for receiving satellite signals from a positioning information satellite. Because the reception environment is thus good, the possibility of successfully synchronizing with and receiving the satellite signal is increased even if the operating clock of the correlation unit is set slow.

When in the indoor time information reception mode or mobile time information reception mode, however, the satellite signal reception device is indoors or is worn by the user while moving around outdoors, the satellite signal strength of the satellite signal reaching the satellite signal reception device may therefore be weak, or the captured positioning information satellite may be hidden from view by a building and lost while the user moves around, or the reception environment could be poor for other reasons. By setting the operating clock of the correlation unit high in this situation, the satellite signal can be quickly captured and synchronized, and the possibility of successfully receiving the satellite signal can be increased compared with using a slow operating clock.

By thus switching the operating clock of the correlation unit to a high or low clock rate according to the time information reception mode, this aspect of the invention can suppress the peak current, extend the battery life and reduce the battery size, and prevent system shutdowns caused by a voltage drop without lowering the success rate of the reception process.

A satellite signal reception device according to another aspect of the invention also has a light quantity detection unit that detects the amount of light incident to the satellite signal reception device, and a motion detection unit that detects the acceleration or inclination angle of the satellite signal reception device. The reception mode control unit determines if the satellite signal reception device is indoors or outdoors based on the amount of light detected by the light quantity detection unit, determines if the satellite signal reception device is in motion or stationary based on change in the acceleration or inclination angle of the satellite signal reception device detected by the motion detection unit, and based on the detection results sets the time information reception mode to the indoor time information reception mode, mobile time information reception mode, or outdoor stationary time information reception mode.

The illuminance (brightness) of indoor lighting and sunlight outdoors differ greatly. Whether the satellite signal reception device is indoors or outdoors can therefore be determined by disposing a light quantity detection unit to the satellite signal reception device and detecting the amount of light (brightness) reaching the reception device.

Furthermore, if an acceleration sensor or angle sensor is also disposed to the satellite signal reception device, sensor output will differ when the satellite signal reception device is resting on top of a table, for example, and when the satellite signal reception device is moving. Whether the satellite signal reception device is in motion or not can therefore be determined.

The reception mode control unit can therefore easily determine based on the sensor output whether the reception mode is the indoor time information reception mode, mobile time information reception mode, or outdoor stationary time information reception mode.

In a satellite signal reception device according to another aspect of the invention the reception mode control unit can select as the positioning information reception mode at least a manual positioning information reception mode that receives positioning information based on a manual operation, and an orbit information reception mode that receives orbit information from a positioning information satellite; and the clock control unit can switch the process clock of the operating unit between at least a first process clock and a second process clock that is faster than the first process clock, can switch the operating clock of the correlation unit between at least a first operating clock and a second operating clock that is faster than the first operating clock, sets the operating clock of the correlation unit to the second operating clock and sets the process clock of the operating unit to the second process clock when the manual positioning information reception mode is selected as the reception mode, and sets the operating clock of the correlation unit to the second operating clock and sets the process clock of the operating unit to the first process clock when the orbit information reception mode is selected as the reception mode.

This aspect of the invention sets the operating clock of the correlation unit to the second operating clock, which is faster than the first operating clock, when in the manual positioning information reception mode for receiving positioning information, and can therefore receive orbit information from a plurality of (3 to 4) positioning information satellites in a short time.

Processing can therefore be completed in a short time by using the fast second operating clock even when the user manually controls the satellite signal reception device. The satellite signal reception device is therefore quickly released from the reception process, and convenience can be improved for the user when using the satellite signal reception device.

Furthermore, because the operating unit operates at the second process clock, which is faster than the first process clock, the positioning process which requires relatively advanced, fast computations can be completed in a shorter time than if the first process clock is used. As a result, the satellite signal reception device is again quickly released from the reception process, and convenience is improved for the use when using the satellite signal reception device.

Furthermore, when in the orbit information reception mode the operating clock of the correlation unit is set to the second operating clock, which is faster than the first operating clock, and a positioning information satellite can therefore be quickly captured and the satellite signal received. Therefore, if the orbit information reception process runs while the satellite signal reception device is indoors and charging, the capture process can be quickly executed to capture the weak satellite signals travelling indoors, and the likelihood of successfully capturing and receiving the signal is improved.

In addition, the operating unit only decodes and stores the orbit information when in the orbit information reception mode, and high speed processing such as required for the positioning process is not needed. The operating unit can therefore be driven at the slow first process clock and the peak current can be suppressed.

Another aspect of the invention is a satellite signal reception device having: a reception unit that captures a positioning information satellite and receives a satellite signal transmitted from the captured positioning information satellite; a data acquisition unit that can acquire at least time information based on the satellite signal received by the reception unit; and a reception mode control unit that controls the reception mode of the reception unit. The reception unit includes a correlation unit that determines a correlation between a code used for capturing the satellite signal and the received satellite signal. The data acquisition unit includes an operating unit that decodes the received data. The reception mode control unit includes a clock control unit that separately controls the operating clock of the correlation unit and the process clock of the operating unit, and can select a manual time information reception mode that receives time information based on a manual operation, or an automatic time information reception mode that receives time information automatically. The clock control unit can switch the process clock of the operating unit between at least a first process clock and a second process clock that is faster than the first process clock, can switch the operating clock of the correlation unit between at least a first operating clock and a second operating clock that is faster than the first operating clock, sets the operating clock of the correlation unit to the first operating clock and sets the process clock of the operating unit to the first process clock when the manual time information reception mode is selected as the reception mode, and sets the operating clock of the correlation unit to the second operating clock and sets the process clock of the operating unit to the first process clock when the automatic time information reception mode is selected as the reception mode.

Another aspect of the invention is a satellite signal reception device having a reception unit that captures a positioning information satellite and receives a satellite signal transmitted from the captured positioning information satellite; a data acquisition unit that can acquire at least time information based on the satellite signal received by the reception unit; and a reception mode control unit that controls the reception mode of the reception unit. The reception unit includes a correlation unit that determines a correlation between a code used for capturing the satellite signal and the received satellite signal. The data acquisition unit includes an operating unit that decodes the received data. The reception mode control unit includes a clock control unit that separately controls the operating clock of the correlation unit and the process clock of the operating unit, and can select an indoor time information reception mode for acquiring time information when indoors, a mobile time information reception mode for acquiring time information when outdoors and moving, and an outdoor stationary time information reception mode for acquiring time information when outdoors and not moving, as the time information reception mode. The clock control unit can switch the process clock of the operating unit between at least a first process clock and a second process clock that is faster than the first process clock, can switch the operating clock of the correlation unit between at least a first operating clock and a second operating clock that is faster than the first operating clock, sets the operating clock of the correlation unit to the second operating clock and sets the process clock of the operating unit to the first process clock when the indoor time information reception mode or the mobile time information reception mode is selected as the reception mode, and sets the operating clock of the correlation unit to the first operating clock and sets the process clock of the operating unit to the first process clock when the outdoor stationary time information reception mode is selected as the reception mode.

These satellite signal reception devices do not have a positioning information acquisition function in the data acquisition unit, but the process executed during time information reception is the same as that of the satellite signal reception device described above, and the same effect is therefore achieved in the time information reception process.

Further preferably, the satellite signal reception device also has a voltage detection device that detects the power supply voltage. The clock control unit sets the process clock of the operating unit to the first process clock and sets the operating clock of the correlation unit to the first operating clock when the voltage detected by the voltage detection device is less than a threshold value.

This aspect of the invention unconditionally sets the clock signals of the operating unit and the correlation unit to the low speed first clock regardless of the reception mode when the power supply voltage goes to less than the threshold value, and can therefore suppress the power supply voltage drop compared with operating at a fast clock rate. System shutdowns caused by a voltage drop can therefore be prevented.

A satellite signal reception device according to another aspect of the invention also has an age detection unit that detects how many years the satellite signal reception device has been used. The clock control unit sets the process clock of the operating unit to the first process clock and sets the operating clock of the correlation unit to the first operating clock when the number of years used detected by the age detection unit is greater than or equal to a preset number of years.

When the age or number of years used becomes greater than or equal to a set number of years, the clock rates of the operating unit and correlation unit are set to the low speed first clock regardless of the reception mode, and the power supply voltage drop can therefore be suppressed compared with operating at the high clock rate. System shutdowns caused by a voltage drop can therefore be prevented even if the secondary battery has deteriorated with age.

Another aspect of the invention is a timekeeping device having the satellite signal reception device described above, a time information generating unit that generates internal time information, a time information adjusting unit that corrects the internal time information, and a time display unit that displays the internal time information. The time information adjusting unit corrects the internal time information based on the time information received in the time information reception mode.

The clock control unit in this aspect of the invention controls the clock speed of the correlation unit and operating unit according to the reception mode, and can therefore suppress the peak current without lowering the reception success rate.

The timekeeping device according to the present invention can therefore increase battery life or reduce the battery size, and can avoid system shutdowns caused by a voltage drop. The invention is therefore particularly useful in portable timepiece such as a wristwatch or pocket watch.

Another aspect of the invention is a satellite signal reception method for a satellite signal reception device that has a reception unit that captures a positioning information satellite and receives a satellite signal transmitted from the captured positioning information satellite, and includes a correlation unit that determines a correlation between a code used for capturing the satellite signal and the received satellite signal, a data acquisition unit that can acquire time information and positioning information based on the satellite signal received by the reception unit, and includes an operating unit that decodes the received data, and a reception mode control unit that controls the reception mode of the reception unit to at least one of a time information reception mode and positioning information reception mode. The satellite signal reception method involves setting the reception mode; separately controlling the operating clock of the correlation unit and the process clock of the operating unit based on the set reception mode; and operating the correlation unit and operating unit using the controlled clock signals to receive a satellite signal.

In this aspect of the invention the clock control step controls the clock speed of the correlation unit and the operating unit according to the reception mode, and can therefore suppress the peak current without lowering the reception success rate. The satellite signal reception method of the invention can therefore increase battery life, reduce battery size, and avoid system shutdowns caused by a voltage drop.

DESCRIPTION OF THE PREFERRED EMBODIMENTS

Preferred embodiments of the present invention are described below with reference to the accompanying figures.

The embodiments described below are specific preferred embodiments of the present invention and certain technically preferred limitations are therefore also described, but the scope of the present invention is not limited to these embodiments or limitations unless specifically stated below.

Embodiment 1

Figure 1:
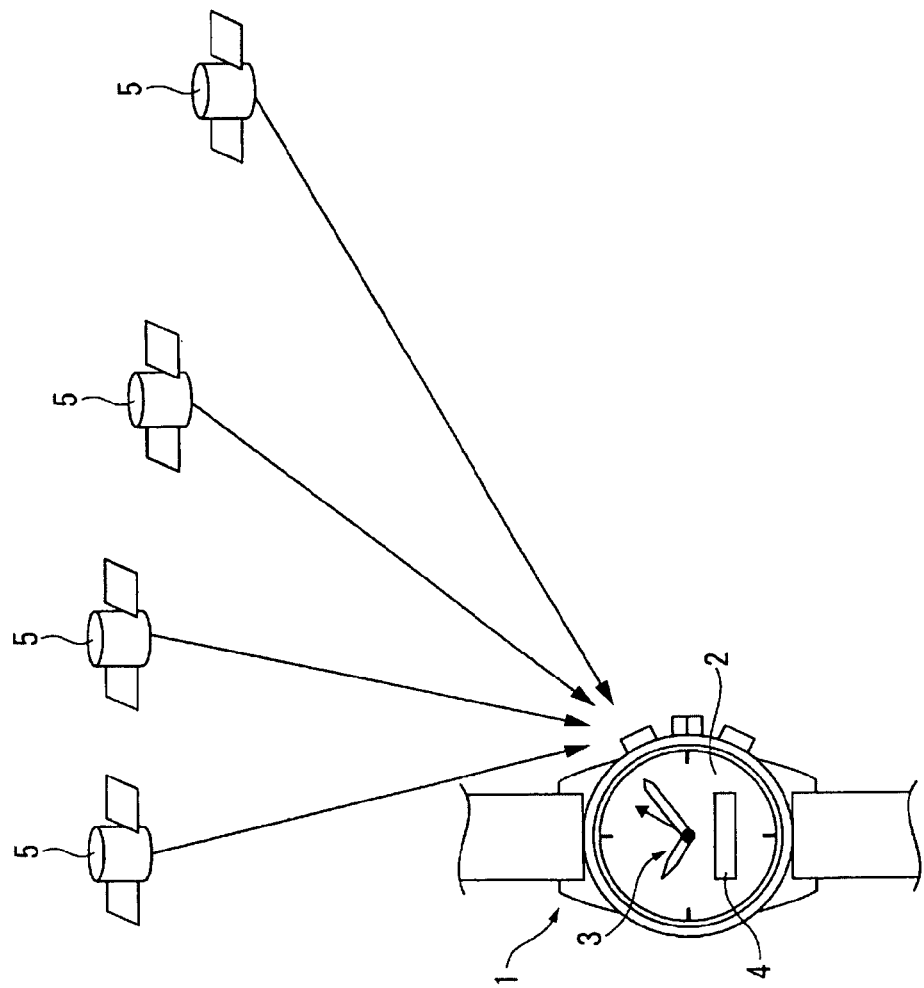
FIG. 1 is a schematic diagram showing a GPS wristwatch according to the present invention.
Figure 2:
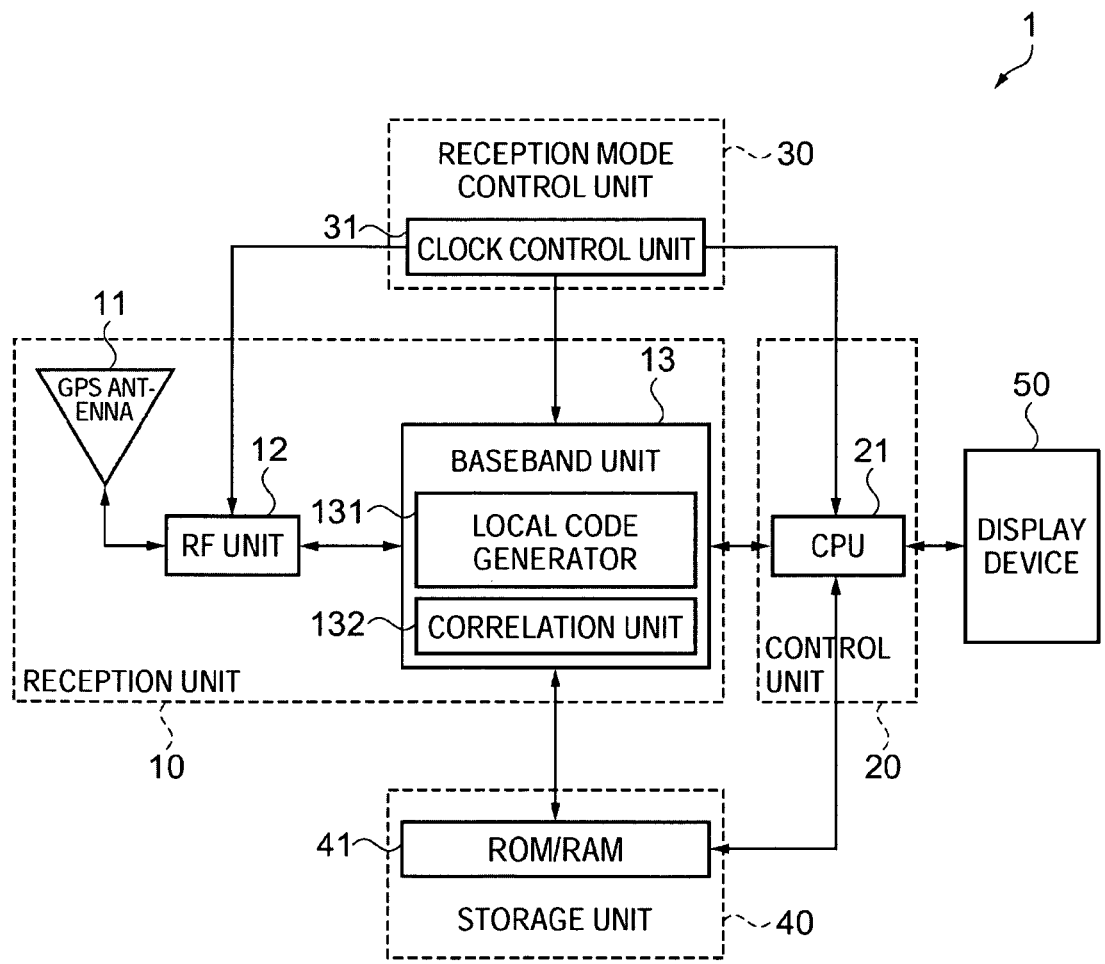
FIG. 2 is a block diagram showing the circuit design of the GPS wristwatch shown in FIG. 1.

FIG. 1 is a schematic diagram showing a wristwatch with a GPS satellite signal reception device 1 (referred to below as a GPS wristwatch 1) as an example of a timepiece according to the present invention. FIG. 2 is a block diagram showing the main hardware configuration of the GPS wristwatch 1 shown in FIG. 1.

As shown in FIG. 1, the GPS wristwatch 1 has a time display unit including a dial 2 and hands 3. A window is formed in a part of the dial 2, and a display 4 such as an LCD panel is located in this window.

The hands 3 include a second hand, minute hand, and hour hand, and are driven through a wheel train by means of a stepping motor.

The display 4 is typically a LCD unit and is used for displaying the latitude and longitude, city name, or other location information, as well as messages.

The GPS wristwatch 1 receives satellite signals from a plurality of GPS satellites 5 orbiting the Earth on fixed orbits in space, acquires satellite time information, and can adjust the internally kept time based on the satellite time information and display the positioning information, that is, the current position, on the display 4.

The GPS satellite 5 is an example of a positioning information satellite used in the invention, and a plurality of GPS satellites 5 are orbiting the Earth in space. At present there are approximately 30 GPS satellites 5 in orbit.

Circuit Design of the GPS Wristwatch

The circuit design of the GPS wristwatch 1 is described next.

As shown in FIG. 2, the GPS wristwatch 1 has a reception unit 10, a control unit 20, a reception mode control unit 30, a storage unit 40, and a display device 50.

The display device 50 includes the hands 3 and display 4 for displaying the time and positioning information.

The GPS wristwatch 1 has an internal battery as the power source. The battery can be a primary battery or a rechargeable secondary battery.

Reception Unit

The reception unit 10 includes a GPS antenna 11, RF unit 12, and baseband unit 13.

The GPS antenna 11 is a patch antenna for receiving satellite signals from a plurality of GPS satellites 5 orbiting the Earth on fixed orbits in space. The GPS antenna 11 is located on the back side of the dial 2, and receives RF signals through the front crystal of the GPS wristwatch 1 and the dial 2.

The dial 2 and crystal are therefore made from materials that pass RF signals, particularly the satellite signals transmitted from the GPS satellites 5. The dial 2, for example is plastic.

The RF (radio frequency) unit 12 receives and converts satellite signals transmitted from the GPS satellites 5 to digital signals, and is identical to devices used in common GPS receivers.

More particularly, while not shown in the figures, the RF unit 12 includes a bandpass filter, PLL circuit, IF filter, VCO (voltage controlled oscillator), A/D converter, mixer, LNA (low noise amplifier), and IF amplifier.

The satellite signal extracted by the bandpass filter is amplified by the low noise amplifier, mixed by the mixer with the signal from the VCO, and down-converted to an IF (intermediate frequency) signal.

The If signal mixed by the mixer passes the IF amplifier and IF filter, and is converted to a digital signal by the A/D converter.

The baseband unit 13 correlates and synchronizes the reception signal, and is identical to the baseband unit used in a common GPS receiver.

More particularly, the baseband unit 13 has a local code generator 131 and a correlation unit 132. The local code generator 131 generates a local code containing the same C/A code used for transmission by the GPS satellites 5. The correlation unit 132 then calculates a correlation value for this local code and the reception signal output from the RF unit 12.

If the correlation value calculated by the correlation unit 132 is greater than or equal to a prescribed threshold value, the C/A code used in the received satellite signal and the local code match, and the satellite signal can be captured (synchronized). The navigation message can therefore be demodulated by applying this correlation process to the received satellite signal using the local code.

Control Unit

The control unit 20 has an operating unit (CPU) 21.

The CPU 21 executes the control program stored in the ROM/RAM 41 of the storage unit 40. More specifically, the CPU 21 acquires time information and positioning information from the navigation message (satellite signal) demodulated by the baseband unit 13. The CPU 21, or more specifically the control unit 20, therefore functions as a data acquisition unit that can acquire the time information and positioning information.

Description of the Navigation Message

The navigation message that is the signal (satellite signal) transmitted from each GPS satellite 5 is described next.

Figure 3:
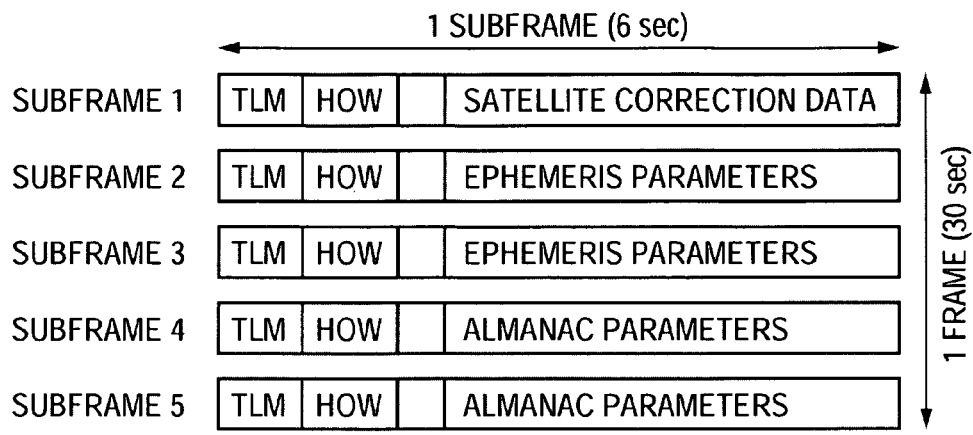
FIG. 3 schematically describes the structure of the GPS satellite signal.
Figure 4:
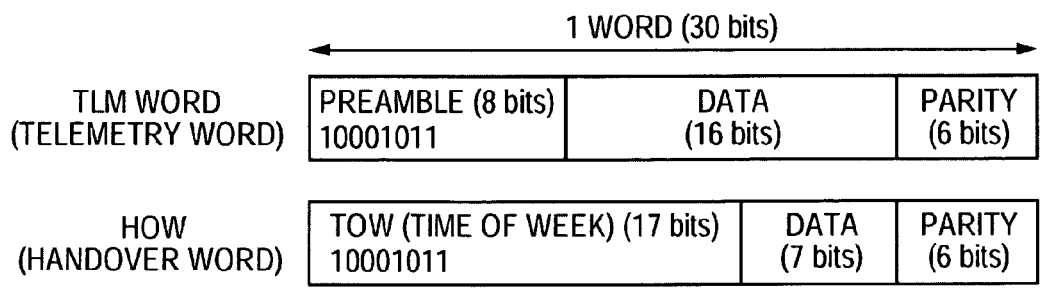
FIG. 4 schematically describes the GPS satellite signal.

FIG. 3 and FIG. 4 schematically describe the GPS signal.

Figure 6:
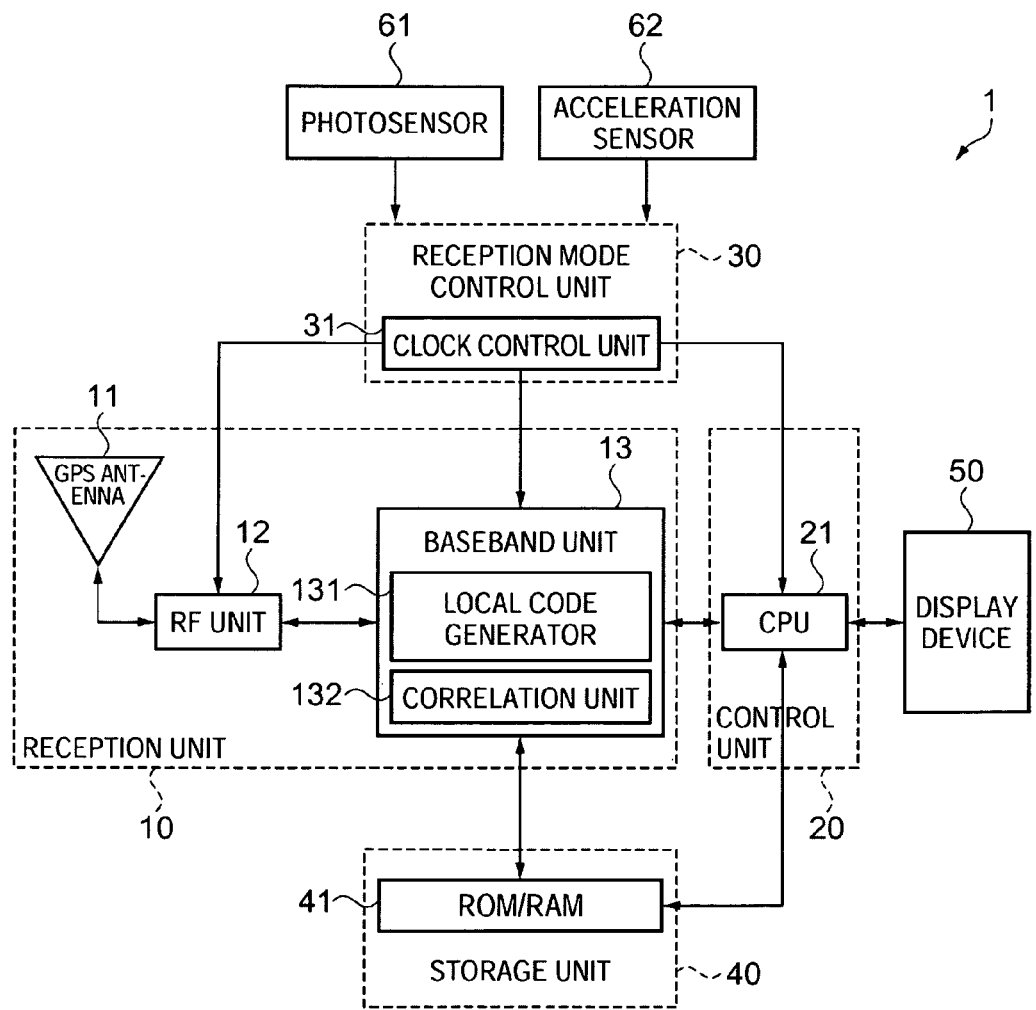
FIG. 6 is a block diagram showing the circuit design of the GPS wristwatch according to a second embodiment of the invention.

As shown in FIG. 6, signals are transmitted from each of the GPS satellites 5 in units of one frame every 30 seconds. One frame contains five subframes. Each subframe is 6 seconds long, and contains 10 words (each word is 0.6 second).

The first word in each subframe is a telemetry (TLM) word storing the TLM data, and each TLM word starts with a preamble as shown in FIG. 4.

The TLM word is followed by a handover word HOW storing the HOW (handover) data, and each HOW starts with the time of week (TOW) (also called the Z count) indicating the GPS time information of the GPS satellite.

The GPS time is the number of seconds since 00:00:00 Sunday night, and is reset to zero at precisely 00:00:00 every Sunday night. The GPS time is thus information expressing the time since the start of the week in seconds, and the elapsed time is a number expressed in 1.5 second units. This GPS time is also called the Z count or the Z count data, and enables the GPS wristwatch 1 to know the current time.

The word data in subframe 1 shown in FIG. 3 contains words storing satellite correction data such as the week number data (WN) and the satellite health information (SVhealth)

The same GPS week number identifies the week in which the current GPS time information is contained.

More specifically, the starting point for the GPS time information is 00:00:00 of Jan. 6, 1980 referenced to the Coordinated Universal Time (UTC), and the week that started on this day is week 0. The GPS receiver can therefore get the precise GPS time from the week number and the elapsed time (number of seconds).

The week number is updated once a week.

Once the receiver gets the week number and counts the seconds passed since the week number was acquired, the current week number of the GPS satellite 5 can be known from the acquired week number and the elapsed time without getting the week number data again. As a result, the approximate current GPS time can be known once the Z count data is acquired. As a result, the CPU 21 normally acquires only the Z count data when getting the time information.

The main frame of the navigation message contained in the signal from the GPS satellite 5 contains 1500 bits and is transmitted at 50 bps.

The main frame is divided into five subframes of 300 bits each.

One frame is equivalent to 30 seconds. One subframe is therefore equivalent to 6 seconds. As described above, the TLM word and the Z count data (TOW) in the HOW word are contained in the first two words of each subframe. The Z count data starts from subframe 1, and six seconds of data is contained in each subframe. Subframe 1 to subframe 5 therefore contain the TLM word and the Z count (TOW) data in the HOW word. The Z count (TOW) data is therefore the time information for the next subframe. For example, the Z count data in subframe 1 is the time data for subframe 2.

As shown in FIG. 3 and FIG. 4, the navigation message carried in the satellite signal from the GPS satellite 5 includes the preamble data and the TOW in the HOW word, and subframe data, including satellite correction data such as the week number and satellite health data, the ephemeris (detailed orbit information for the transmitting GPS satellite 5), almanac (orbit information for all GPS satellites 5), and the UTC data. More specifically, the subframe data of the navigation message is carried in subframe 1 to subframe 5, and the data in these five subframes render one frame data unit. The subframe data is divided into words 1 to 10.

The HOW data or Z count data is therefore transmitted at 6-second intervals, and the ephemeris parameters and almanac parameters are transmitted at 30-second intervals.

Because the signals described above are transmitted from the GPS satellites 5, satellite signal reception as used herein means phase synchronization with the C/A code in the satellite signal transmitted from each GPS satellite 5.

More specifically, the baseband unit 13 must synchronize with the signal from the GPS satellite 5 in order to get the frame data from a particular GPS satellite 5.

The C/A code is used for synchronization with 1 ms precision, and is a 1023-chip pseudo random noise code that repeats every 1 ms. The C/A code (1023 chip (1 ms) code) is different for each of the plural GPS satellites 5, and is unique to a particular satellite.

Therefore, to receive the satellite signal from a particular GPS satellite 5, the reception unit 10 generates the unique C/A code for a particular GPS satellite 5 and phase synchronizes with the C/A code from the selected GPS satellite 5 to receive the satellite signal.

By synchronizing with the C/A code (1023 chips (1 ms)), the preamble of the TLM word and the HOW word of each subframe can be received, and the Z count data (time information) can be acquired from the HOW word.

The positioning information can be acquired by reading the ephemeris parameters in the satellite signals from three to four satellites. The ephemeris data can be acquired by receiving 600 bits or approximately 12 seconds from the preamble of subframe 2, which is transmitted every 30 seconds.

Reception Mode Control Unit

The reception mode control unit 30 has a clock control unit 31. The clock control unit 31 has a temperature-controlled crystal oscillator (TCXO) circuit that can output clock signals at a plurality of frequencies. More specifically, the clock control unit 31 can frequency divide the clock signal output from the crystal oscillator and simultaneously output clock signals at a plurality of frequencies.

The clock control unit 31 outputs a clock signal for the PLL circuit to the RF unit 12.

The clock control unit 31 also outputs a clock signal for operating the correlation unit 132 to the baseband unit 13, and outputs a clock signal for driving the CPU 21 to the control unit 20.

The clock control unit 31 in this embodiment of the invention can switch the frequency of the clock signal output to the correlation unit 132 to a high frequency or a low frequency, and can thus drive the correlation unit 132 at a first operating clock or a second operating clock.

The second operating clock is set faster than the first operating clock. In this embodiment of the invention the first operating clock is 12 MHz and the second operating clock is 48 MHz.

The clock control unit 31 can also switch the frequency of the clock signal output to the CPU 21 to a high frequency or a low frequency, and can thus drive the CPU 21 at a first process clock or a second process clock. In this embodiment of the invention the first process clock is 12 MHz and the second process clock is 48 MHz.

The reception mode control unit 30 sets the reception mode, and controls the process clock of the CPU 21 and the operating clock of the correlation unit 132 through the clock control unit 31.

This embodiment of the invention has two reception modes, a manual time information reception mode (manual reception mode) in which receiving the time information is manually controlled, and an automatic time information reception mode in which the time information is received automatically.

The manual time information reception mode is the mode that is set when the user presses a button on the GPS wristwatch 1, for example, to manually initiate receiving the time information.

The automatic time information reception mode is the mode that is set when the internal time kept by the GPS wristwatch 1 reaches a preset reception time.

The reception mode control unit 30 controls the process clock and the operating clock according to the settings shown in Table 1 below based on which reception mode is set.

TABLE 1

| Time acquisition | Baseband clock | CPU clock | Reason |
|---|---|---|---|
| Manual | low | low | Outdoor reception expected and only time data is decoded |
| Automatic | high | low | Fast re-synchronization is needed if reception is difficult due to multipath interference or a weak signal or the signal is dropped |

As shown in the table, when the manual time information reception mode (manual reception) is selected, the reception mode control unit 30 sets the operating clock (baseband clock) of the correlation unit 132 to the first operating clock (low speed), and sets the process clock (CPU clock) of the CPU 21 to the first process clock (low speed).

When the automatic time information reception mode (automatic reception) is selected, the reception mode control unit 30 sets the operating clock of the correlation unit 132 to the second operating clock (high speed), and sets the process clock of the CPU 21 to the first process clock (low speed).

Note that in Table 1 the first operating clock and first process clock are indicated by "low," and the second operating clock and second process clock are indicated by "high."

The reasons for these settings are also shown in Table 1.

More specifically, the manual time information reception mode (manual reception) is set by the user. When the user manually receives the satellite signal, the user is assumed to be in a location where reception is easy. More particularly, the GPS wristwatch 1 is expected to be outdoors where satellite signals can be easily received and is stationary. Signals from a plurality of satellites, typically five to ten satellites, can be received when outdoors, the signal strength is also high, and satellite signals can be easily received. If reception is initiated when outdoors, the signal can be reliably received from at least one of the satellites even if the time required to synchronize with the satellite signal (that is, to capture a GPS satellite 5) is slightly long. Outdoors is therefore considered to be an environment where satellite signals can be easily received.

In addition, only the time data is received when in the manual reception mode, and it is therefore sufficient to receive only the Z count data. In order to receive the Z count data, it is only necessary to receive the TLM word and HOW word which are carried in the 60 bits from the preamble of each subframe, which is transmitted every 6 seconds, and receiving the TLM word and HOW word can be received in approximately 1.2 seconds.

The satellite signal can therefore be reliably captured and the received signal decoded even if the operating clock of the correlation unit 132 is set to the low speed mode.

It is also usually only necessary to decode the Z count data, which is the time passed since the beginning of the week, and the CPU 21 can easily process the data even at a low clock rate.

When in the automatic time information reception mode (automatic reception), however, the reception environment of the GPS wristwatch 1 is unpredictable. Receiving signals directly from the GPS satellite 5 might therefore not be possible, multipath interference could result from signals bouncing off of buildings, for example, or the GPS wristwatch 1 might be indoors where weak satellite signals cannot be received. The operating clock of the correlation unit 132 is therefore increased so that a satellite can be captured and the reception signal can be decoded by synchronizing quickly when reception conditions are good. If the captured satellite is lost, resynchronizing quickly is possible by operating the correlation unit 132 at a high speed.

Operation is therefore configured as shown in Table 1 for these reasons.

Storage Unit and Display Device

The storage unit 40 has ROM/RAM 41. The program executed by the CPU 21 is stored in ROM. The decoded time information and positioning information is stored in RAM.

As described above, the display device 50 includes the hands 3 and display 4, and is controlled by the control unit 20.

The hands 3 are driven by a stepping motor and wheel train, and indicate the internal time that is adjusted by the received time data.

The display 4 displays information such as time information and positioning information.

Time Information Reception Process

The reception operation of the GPS wristwatch 1 is described next with reference to the flow chart in FIG. 5. This first embodiment of the invention switches the clock rate between high and low according to the reception mode when receiving the Z count (hour, minute, second) data.

Figure 5:
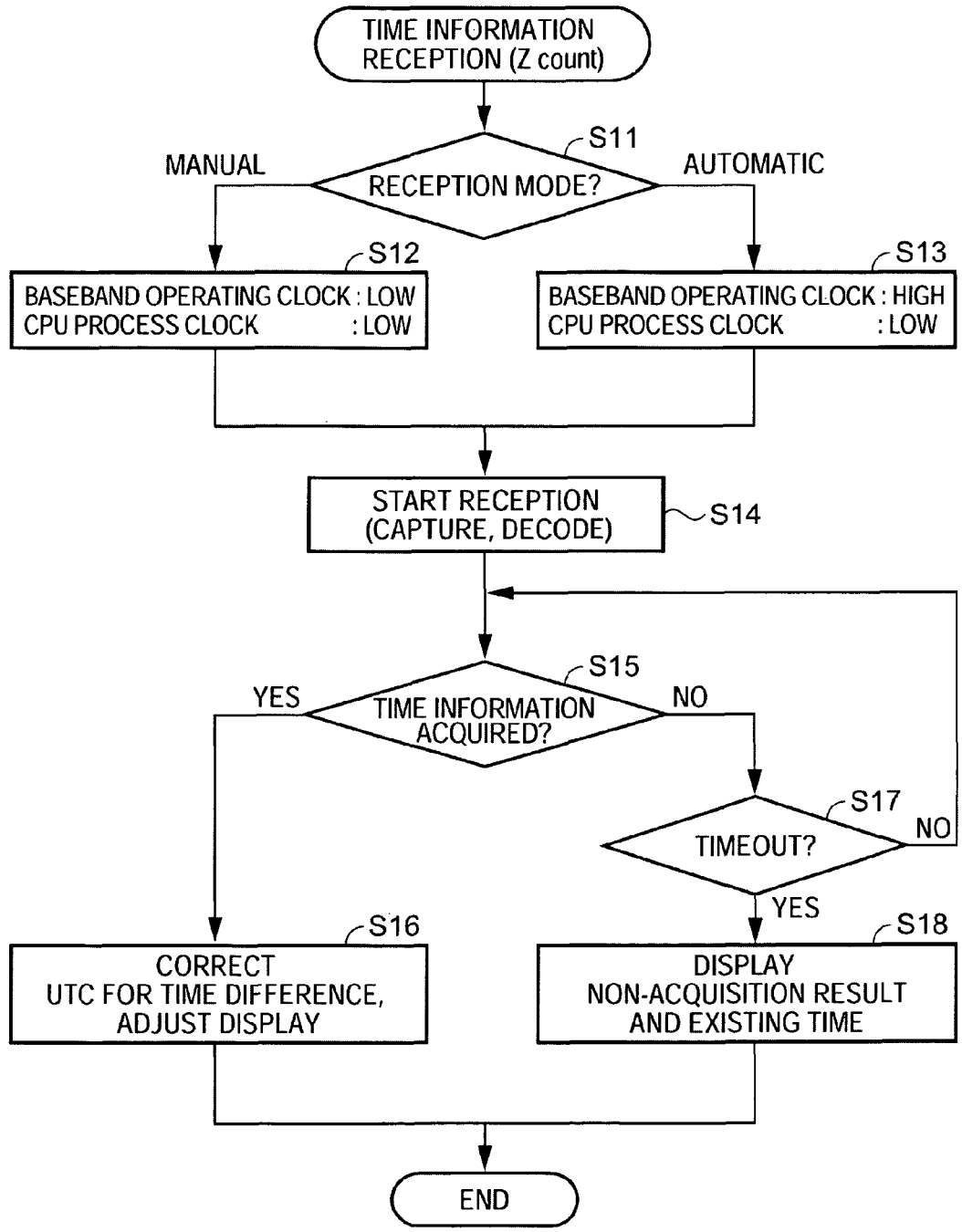
FIG. 5 is a flow chart describing the time information reception process of the first embodiment of the invention.

The time information reception process shown in FIG. 5 executes when reception is manually activated by the user and when the preset reception time arrives. This preset reception time is, for example, 2:00 or 3:00 a.m. or 7:00 or 8:00 a.m.

Setting the reception time to 2:00 or 3:00 a.m. is effective because the likelihood is high that the GPS wristwatch 1 has been taken off by the user and has been left stationary indoors on a table beside the window, for example, electrical appliance use is minimal and there is little noise, and the signal reception environment is good.

Setting the reception time to 7:00 or 8:00 a.m. is also effective because this is the typical time for commuting to work or school, and the likelihood is high that the user wearing the GPS wristwatch 1 will be outdoors sometime during this period. The invention is not limited to these times, however, and the automatic reception time could be set by the user.

When the time information reception process runs the reception mode control unit 30 first determines whether the reception mode is the manual time information reception mode (manual reception mode) activated by the user, or the automatic time information reception mode (automatic reception mode) activated when the preset time arrives (S11).

If S11 determines that the manual reception mode is set, the reception mode control unit 30 sets the operating clock (baseband operating clock) of the correlation unit 132 to low (first operating clock) and sets the process clock (CPU process clock) of the CPU 21 to low (first process clock) (S12) as shown in Table 1.

If S11 determines that the automatic reception mode is set, the reception mode control unit 30 sets the operating clock (baseband operating clock) of the correlation unit 132 to high (second operating clock) and sets the process clock (CPU process clock) of the CPU 21 to low (first process clock) (S13) as shown in Table 1.

The correlation unit 132 and CPU 21 operate at the clock rates set in steps S12 and S13 and the satellite signal reception process starts (S14). The local code generator 131 therefore sequentially generates the local codes equal to the unique C/A codes of the satellites. The correlation unit 132 determines the correlation between each of the local codes and the received satellite signal to find a GPS satellite 5 that can be synchronized with.

It takes several hundred milliseconds to complete the capture process for one satellite. If the GPS wristwatch 1 has not previously run the satellite capture process and acquired orbit information (almanac data) for all of the satellites, that is, if the GPS wristwatch 1 is operating from a cold start, the GPS wristwatch 1 searches for any GPS satellite 5 it can find. Even if searching starts from GPS satellite 5 No. 1 and a satellite is not captured until GPS satellite 5 No. 30, that is, capturing a satellite takes the longest time, a satellite can be captured in approximately 2 seconds by setting the operating clock (baseband operating clock) of the correlation unit 132 to the high clock rate (second operating clock).

If the operating clock of the correlation unit 132 is set to the low clock rate (first operating clock) and the operating clock is therefore ¼ the high speed clock, the satellite capture process takes four times as long and a maximum of approximately 8 seconds is required to capture a satellite.

The GPS wristwatch 1 normally stores orbit information (almanac parameters) for all of the satellites, and therefore attempts to capture a GPS satellite 5 passing overhead when the satellite signal is received. In this case it is not necessary to capture (search for) all satellites, the search can be concentrated on those GPS satellites 5 passing overhead at the time of reception, and the processing time required to capture one satellite can be shortened to several hundred milliseconds if the correlation unit 132 operates at the high clock rate. If the operating clock of the correlation unit 132 is the low clock rate (¼ of high speed clock), the satellite capture process takes four times as long as the time (several hundred milliseconds) required when the operating clock is set to high.

Therefore, if the operating clock (baseband operating clock) of the correlation unit 132 is set to high (the second operating clock), a GPS satellite 5 can be captured within approximately 2 seconds from a cold start and within several hundred milliseconds if the almanac parameters can be referenced.

The CPU 21 then decodes the reception signal from the captured GPS satellite 5.

The CPU 21 then determines if the time information was acquired (S15). The CPU 21 more specifically determines that the time information was acquired if the correlation value output by the correlation unit 132 is greater than or equal to the threshold value, and the Z count data was also acquired.

The CPU 21 could alternatively use a parity check to determine if the time information was acquired based on whether or not the Z count data is reliable. More specifically, the parity data following the TOW data of the HOW word can be used to confirm if the data is correct. If the parity check returns an error, there is a problem with the Z count data and the CPU 21 knows that the time information was not acquired.

If S15 determines that the time information was acquired, the CPU 21 corrects the internal time based on the received time information. The time information in the satellite signal sent from the GPS satellite 5, that is, the GPS time acquired from the Z count, is the same time for all GPS satellites, and the Coordinated Universal Time (UTC) can be obtained by adding the UTC offset (current time+14 seconds) to the GPS time. The UTC offset can be acquired from the received satellite signal data, or a predetermined value stored in the storage unit 40 can be acquired and used.

The storage unit 40 also stores the current position, that is, the time zone, of the GPS wristwatch 1. As a result, the CPU 21 adds the UTC offset to the received GPS time to get the UTC, corrects the time difference to the UTC time based on the time zone stored in the storage unit 40, and adjusts the internal clock based on this correction time (S16).

If the CPU 21 determines in step S15 that the time information could not be acquired, the CPU 21 determines if the reception process timed out (S17). As described above the Z count data is transmitted at a 6-second interval and reception takes approximately 1.2 seconds. Therefore, if the time information could not be acquired by the time 8 seconds pass after satellite signal reception started, operation times out and the CPU 21 determines that the time information could not be received.

The CPU 21 therefore continues to determine if the time information was acquired in S15 until S17 determines that operation timed out.

The timeout determination process S17 above compares the total of the GPS satellite 5 search time and the decoding time with the timeout threshold value, but the search time and decoding time could be separately compared with the timeout threshold value.

For example, because the GPS satellite 5 search (capture) process can synchronize in several hundred milliseconds if outdoors, the timeout threshold value for the search time could be set to 1 second. In this case, if a GPS satellite 5 is not captured within 1 second after the search process starts, the CPU 21 could determine that a satellite signal cannot be received because of being indoors, for example, and abort the reception process.

In addition, if a GPS satellite 5 is captured but the decoding process is not completed within a predetermined threshold value time, operation times out because the satellite signal is weak and cannot be decoded, and the reception process aborts. The timeout threshold value for the decoding process can be set to 12 seconds, which is the decoding time for two navigation messages, to allow for missed navigation message data so that operation times out and the reception process aborts if the decoding process does not end when 12 seconds have passed after the decoding process starts.

If operation times out and S17 returns yes, the CPU 21 runs a process to indicate the non-acquisition result, that is, that a signal could not be captured, and display the existing internal time (S18).

If the GPS wristwatch 1 is in an environment where reception is not possible, such as indoors or on the subway where satellite signals will not reach, operation times out because there is no GPS satellite 5 that can be captured even if the GPS wristwatch 1 searches for all GPS satellites 5. In this situation power will simply be wasted by continuing to operate the reception unit 10.

Therefore, if operation times out in S17, the GPS wristwatch 1 terminates the GPS satellite 5 search (reception) process and runs the display process in S18. This prevents unnecessary power consumption.

The time information reception process can thus be executed in both manual reception and automatic reception modes.

EFFECT OF THIS EMBODIMENT

The effect of this embodiment of the invention is described next.

When receiving time information, the GPS wristwatch 1 switches the operating clock of the correlation unit 132 to a high or low clock rate based on whether the reception mode is set to manual reception or automatic reception. The peak current can be reduced and an excessive voltage drop can be avoided in the manual reception mode because the correlation unit 132 is driven at a first operating clock rate that is lower than the second operating clock rate.

Because the first operating clock is 12 MHz and ¼ the second operating clock (48 MHz), the peak current can be reduced to approximately ¼ the peak current when the correlation unit 132 is driven at the second operating clock and an excessive voltage drop can therefore be avoided.

If the peak current can be lowered and an excessive voltage drop can be avoided, system shutdowns caused by a voltage drop can be avoided and the operating time (duration time) of the GPS wristwatch 1 can be increased. If a rechargeable battery is used as the power supply, avoiding excessive voltage drops reduces the frequency of charge/discharge cycles, reduces battery wear, and can therefore extend battery life.

During manual reception the user normally operates the GPS wristwatch 1 outdoors where GPS satellite 5 signal reception is good and the GPS wristwatch 1 is stationary. Because the reception environment is good, the likelihood is high that the GPS wristwatch 1 can synchronize with and receive the satellite signal even if the operating clock of the correlation unit is set to a low rate.

During automatic reception the operating clock of the correlation unit 132 is set to a second operating clock at a higher rate than the first operating clock. As a result, the GPS wristwatch 1 can quickly synchronize with the satellite signal and the likelihood of successfully receiving the satellite signal is greater than if the operating clock remains set to a low rate even if reception is poor, such as if the satellite signal reaching the GPS wristwatch 1 is weak or the GPS wristwatch 1 moves during reception.

This embodiment of the invention thus prevents the reception success rate from dropping by switching the operating clock of the correlation unit 132 to a high or low clock rate depending on whether the time information reception mode is set to manual reception or automatic reception. Peak current can also be suppressed, an excessive voltage drop can be avoided and system shutdowns caused by a voltage drop can be prevented, the frequency of the charge/discharge cycle can be reduced and battery life extended, and battery size can also be reduced.

Furthermore, because this embodiment of the invention receives time information, which contains less data to be decoded than the positioning information, decoding can be easily handled even if the process clock of the CPU 21 is set to the low speed first process clock. The peak current can therefore be reduced compared with driving the CPU 21 at the faster second process clock rate. Furthermore, because the amount of data processed is small, the data can be reliably processed even if the clock rate of the CPU 21 is slow.

If operation times out in S17 and the CPU 21 cannot acquire the time information, the non-acquisition result is displayed on the display 4, for example, in S18. The user can therefore easily know that the time information was not received. The user can then receive the time information again at an appropriate time by means of manual reception.

Furthermore, because the existing time is displayed if receiving the time information fails, there is no interference with use of the GPS wristwatch 1 as a timepiece, and a GPS wristwatch 1 that is easy to use can be achieved.

Embodiment 2

A second embodiment of the invention is described next. In this second and further embodiments described below, parts that are substantially identical to parts in other embodiments are identified by the same reference numerals and further description thereof is omitted.

As shown in FIG. 6, the second embodiment of the invention differs from the configuration of the first embodiment by also having a photosensor 61 and an acceleration sensor 62.

The photosensor 61 is disposed exposed at the surface of the dial 2 of the GPS wristwatch 1, for example, and measures how much light reaches the GPS wristwatch 1, or more specifically the luminous intensity or illuminance.

The reception mode control unit 30 in this embodiment of the invention therefore determines if the GPS wristwatch 1 is outdoors or indoors based on the result from the photosensor 61. More specifically, sunlight is brighter than indoor lighting, and whether the GPS wristwatch 1 is indoors or outdoors can therefore be determined by comparing the output value of the photosensor 61 with a predetermined threshold value.

For example, the threshold value may be set to approximately 5000 lux, and the reception mode control unit 30 could determine that it is outdoors if the illuminance measured by the photosensor 61 is greater than or equal to the threshold value, and indoors if less than the threshold value.

Whether it is outdoors or indoors may also be determined by, for example, setting the threshold value to approximately 100 lux, and the reception mode control unit 30 determining that it is indoors if the measured illuminance is greater than or equal to the threshold value, and indoors if less than the threshold value.

The reception mode control unit 30 can therefore determine that it is indoors if the illuminance measured by the photosensor 61 is in the range 100-5000 lux, and outdoors if less than 100 lux or greater than or equal to 5000 lux.

Further alternatively, the reception mode control unit 30 may determine whether it is currently day or night based on the time indicated by the internal timekeeping device, and switch operation based on a daytime threshold value and a nighttime threshold value.

The photosensor 61 is thus an amount of light detection device, and functions as an indoor/outdoor detection device that detects whether the GPS wristwatch 1 is indoors or outdoors.

The acceleration sensor 62 detects the change in acceleration accompanying movement of the GPS wristwatch 1. When a user wearing the GPS wristwatch 1 swings his arms while walking, for example, the acceleration data detected by the acceleration sensor 62 also changes. Whether the GPS wristwatch 1 is moving or not can therefore be detected from the change in acceleration data detected by the acceleration sensor 62.

An angle sensor such as a gyroscopic sensor can be used instead of an acceleration sensor 62. The angle sensor detects, for example, the angle from a reference position of the GPS wristwatch 1, such as the angle to the dial 2 in a level position. When the wrist moves while the person wearing the GPS wristwatch 1 is moving, the angle detected by the angle sensor also changes. Whether the GPS wristwatch 1 is moving or not can therefore be detected from the change in the angle detected by the angle sensor.

The reception mode control unit 30 sets the reception mode, and controls the process clock of the CPU 21 and the operating clock of the correlation unit 132 through the clock control unit 31.

The reception modes that can be set in this embodiment of the invention are an indoor time information reception mode for receiving time information when an indoor determination is made based on the photosensor 61, a mobile time information reception mode for receiving when motion is detected by the acceleration sensor 62, and an outdoor stationary time information reception mode when an indoor determination is made based on the photosensor 61 and a not-moving (stationary) determination is made based on the acceleration sensor 62.

The reception mode control unit 30 then controls the process clock and the operating clock according to the settings shown in Table 2 based on the mode setting.

TABLE 2

| Time acquisition | Baseband clock | CPU clock | Reason |
| --- | --- | --- | --- |
| Not indoors/not moving | low | low | Outdoor reception expected and only time data is decoded |
| Indoors or moving | high | low | Fast re-synchronization is needed if reception is difficult due to multipath interference or a weak signal or the signal is dropped |

As shown in the table, when the outdoor stationary time information reception mode is selected because outdoors is not detected and movement is not detected, the reception mode control unit 30 sets the operating clock (baseband clock) of the correlation unit 132 to the first operating clock (low speed), and sets the process clock (CPU clock) of the CPU 21 to the first process clock (low speed).

When the indoor time information reception mode is selected because indoors is detected, the reception mode control unit 30 sets the operating clock of the correlation unit 132 to the second operating clock (high speed), and sets the process clock of the CPU 21 to the first process clock (low speed).

Note that in Table 2 the first operating clock and first process clock are indicated by "low," and the second operating clock and second process clock are indicated by "high."

Other aspects of the configuration of this GPS wristwatch 1 are the same as in the first embodiment of the invention, and further description thereof is omitted below.

Time Information Reception Process

The reception operation of the GPS wristwatch 1 according to the second embodiment of the invention is described next with reference to the flow chart in FIG. 7.

This second embodiment is the same as the first embodiment in that it switches the clock rate between high and low according to the reception mode when receiving the Z count (hour, minute, second) data. This embodiment differs in that the reception mode is determined based on the detection results from the photosensor 61 and the acceleration sensor 62.

Figure 7:
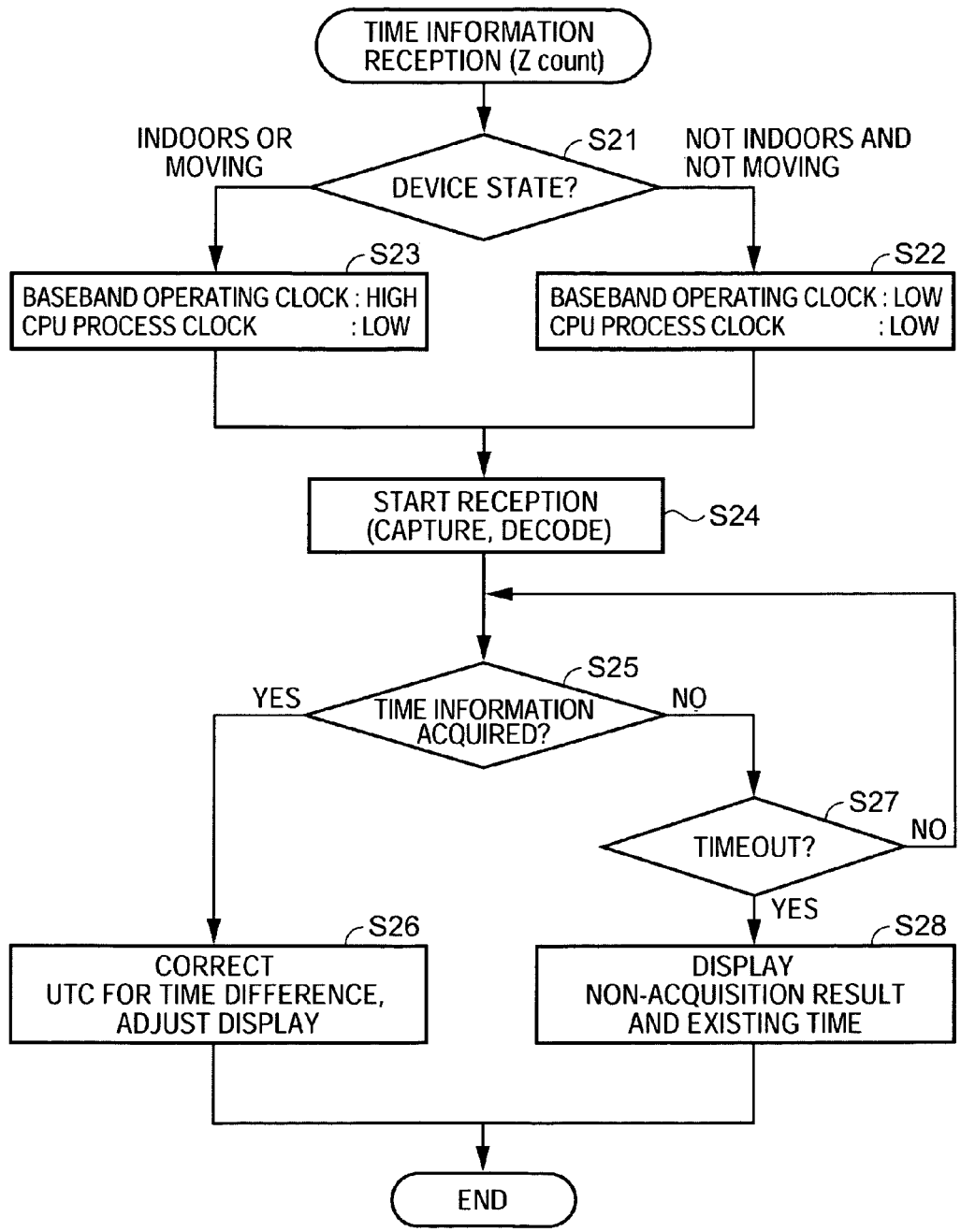
FIG. 7 is a flow chart describing the time information reception process of the second embodiment of the invention.

Note that steps S24 to S28 in the flow chart in FIG. 7 are the same as steps S14 to S18 in the first embodiment, and further description thereof is omitted.

As in the first embodiment, the time information reception process shown in FIG. 7 executes when reception is manually activated by the user and when the preset reception time arrives.

When the time information reception process runs the reception mode control unit 30 first determines based on the detection results from the photosensor 61 and the acceleration sensor 62 whether the state of the GPS wristwatch 1, that is, the device state, is the indoor time information reception mode, the mobile time information reception mode, or the outdoor stationary time information reception mode (S21).

If the outdoor stationary time information reception mode is detected in S21, the reception mode control unit 30 sets the operating clock (baseband operating clock) of the correlation unit 132 to low (first operating clock) and sets the process clock (CPU process clock) of the CPU 21 to low (first process clock) (S22) as shown in Table 2.

If S21 determines that the indoor time information reception mode or the mobile time information reception mode is set, the reception mode control unit 30 sets the operating clock (baseband operating clock) of the correlation unit 132 to high (second operating clock) and sets the process clock (CPU process clock) of the CPU 21 to low (first process clock) (S23).

The correlation unit 132 and CPU 21 operate at the clock rates set in steps S22 and S23 and the satellite signal reception process starts (S24).

The CPU 21 then determines if the time information was acquired (S25).

If S25 determines that the time information was acquired, the CPU 21 corrects the internal time based on the received time information. More specifically, the CPU 21 corrects the time difference in the time information of the received UTC based on the time zone stored in the storage unit 40, adjusts the internal clock to the corrected time, and adjusts the time displayed by the hands 3 and display 4 (S26).

If the time information was not acquired in S25, the CPU 21 determines if the reception process timed out (S27).

If operation times out and S27 returns yes, the CPU 21 runs a process to indicate the non-acquisition result, that is, that a signal could not be captured, and display the existing internal time (S28).

The time information reception mode is thus executed based on the device state of the GPS wristwatch 1.

This embodiment of the invention has the same effect as the first embodiment described above.

More particularly, when receiving time information, the GPS wristwatch 1 determines whether the GPS wristwatch 1 is indoors or in motion based on the output of a photosensor 61 and a acceleration sensor 62, and switches the operating clock of the correlation unit 132 to a high or low clock rate according to the reception mode identified by the sensor output. The peak current can be reduced and an excessive voltage drop can be avoided in the outdoor stationary time information reception mode because the correlation unit 132 is driven at a first operating clock rate that is lower than the second operating clock rate.

In the outdoor stationary time information reception mode the GPS wristwatch 1 is not moving and is outdoors where reception of satellite signals from the GPS satellites 5 is good. More specifically, because the reception environment is good, the probability of successfully synchronizing with and receiving a satellite signal is high even if the operating clock of the correlation unit 132 is slow.

However, if the GPS wristwatch 1 is indoors or is in motion, the operating clock of the correlation unit 132 is set to a second operating clock that is faster than the first operating clock. As a result, the GPS wristwatch 1 can quickly synchronize with the satellite signal even if the reception environment is poor and the satellite signal reaching the GPS wristwatch 1 is weak or the GPS wristwatch 1 is moving during reception, and the probability of successful reception is greater than if a slow operating clock is used.

By thus switching the operating clock of the correlation unit 132 to a low or high clock rate according to whether the GPS wristwatch 1 is indoors or outdoors or is moving, this embodiment of the invention can suppress the peak current, extend the battery life and reduce the battery size, and prevent system shutdowns caused by a voltage drop without lowering the success rate of the reception process.

Embodiment 3

A third embodiment of the invention is described next.

The first and second embodiments are described when used to receive the time information. This third embodiment of the invention describes a processing method for receiving positioning information. The hardware configuration of the GPS wristwatch 1 is identical to the first embodiment, and further description thereof is omitted.

The reception mode control unit 30 in this third embodiment sets the reception mode, and controls the process clock of the CPU 21 and the operating clock of the correlation unit 132 through the clock control unit 31.

The reception mode in this embodiment of the invention is set to a manual positioning information reception mode (manual reception) for receiving the positioning information in response to a manual operation, or to an orbit information reception mode (almanac reception) for receiving the almanac data containing the orbit information.

The reception mode control unit 30 controls the process clock and the operating clock according to the settings shown in Table 3 below based on which reception mode is set.

TABLE 3

| Time acquisition | Baseband clock | CPU clock | Reason |
|---|---|---|---|
| Manual | high | high | For fast processing (requires approx. 60 seconds depending on device state) |
| Almanac | high | low | Fast processing not required because only the almanac data is decoded and stored |

As shown in the table, when the manual positioning information reception mode (manual reception) is selected, the reception mode control unit 30 sets the operating clock (baseband clock) of the correlation unit 132 to the second operating clock (high speed), and sets the process clock (CPU clock) of the CPU 21 to the second process clock (high speed).

When the orbit information reception mode (almanac reception) is selected, the reception mode control unit 30 sets the operating clock of the correlation unit 132 to the second operating clock (high speed), and sets the process clock of the CPU 21 to the first process clock (low speed).

Note that in Table 3 the first operating clock and first process clock are indicated by "low," and the second operating clock and second process clock are indicated by "high."

The orbit information (almanac) contains orbit information for all orbiting positioning information satellites in the constellation, and the position of each GPS satellite 5 can be predicted based on this orbit information. The orbit information can therefore be used when searching for a GPS satellite 5 to quickly detect and synchronize with a GPS satellite 5 from which the satellite signal can be received. However, because the almanac is updated regularly, the orbit information must be received again in order to acquire the latest almanac when a certain amount of time, such as one or two weeks, has passed since the last time the almanac was received.

Receiving the almanac takes approximately 12 to 15 minutes, however, and power consumption increases accordingly. The power supply of the GPS wristwatch 1 in this embodiment of the invention is therefore a rechargeable secondary battery that can be charged through a charging coil, for example, and the orbit information reception mode is enabled when the GPS wristwatch 1 is connected to the charger and the battery is being charged.

Positioning Information Reception Process

The reception operation of the GPS wristwatch 1 according to this third embodiment of the invention is described next with reference to the flow charts in FIG. 8 to FIG. 10.

Figure 8:
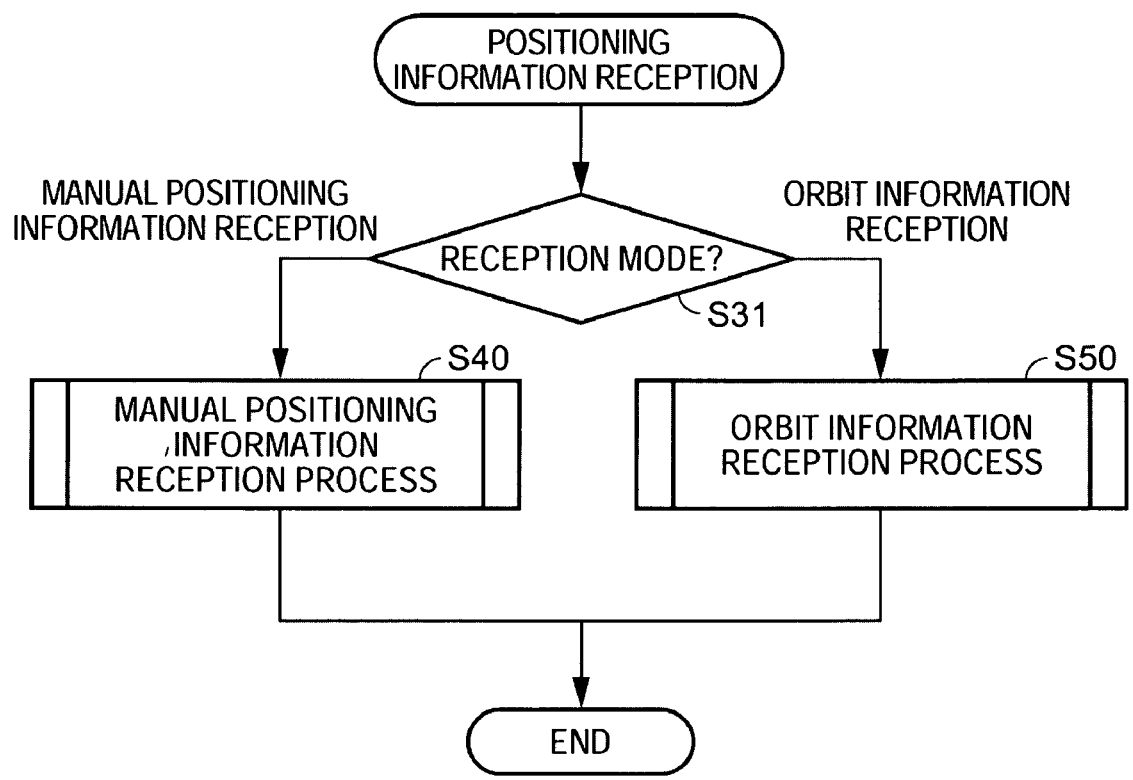
FIG. 8 is a flow chart describing the positioning information reception process of the third embodiment of the invention.

The positioning information reception process shown in FIG. 8 is executed when the user manually starts positioning information reception, and when the battery is being charged.

When this positioning information reception process starts the reception mode control unit 30 determines that the manual positioning information reception mode was entered when the user manually starts positioning information reception, and determines that the orbit information reception mode was enabled when the GPS wristwatch 1 starts charging the battery (S31).

If the time passed since the last time the orbit information reception process ran is less than a set time (such as 6 days) when charging starts, the reception mode control unit 30 may decide that updating the orbit information (almanac) is not necessary and therefore not enable the orbit information reception mode.

Figure 9:
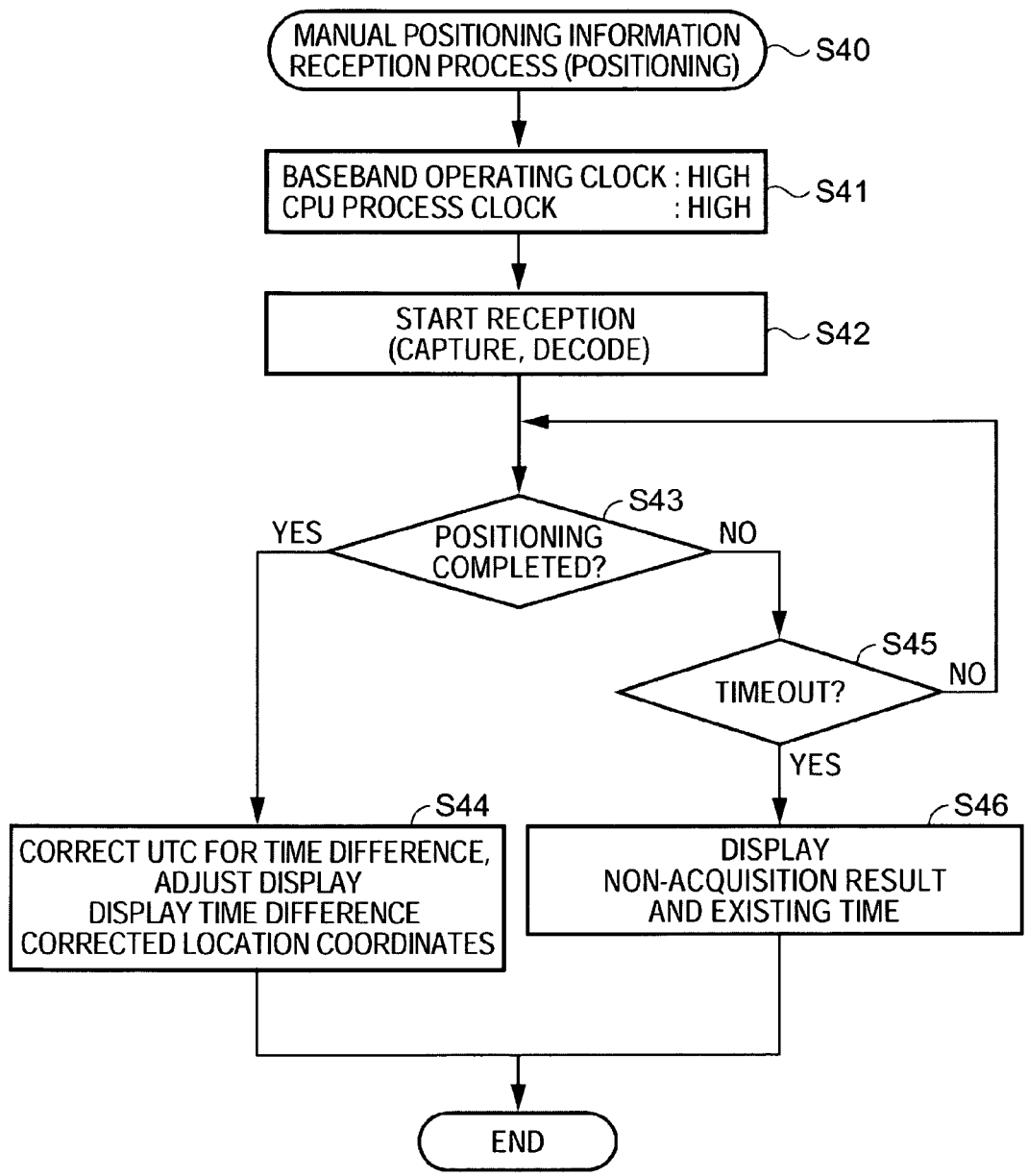
FIG. 9 is a flow chart describing the manual positioning information reception process of the third embodiment of the invention.

If the manual positioning information reception mode is detected in S31, the reception mode control unit 30 runs the manual positioning information reception process shown in FIG. 9 (S40).

Figure 10:
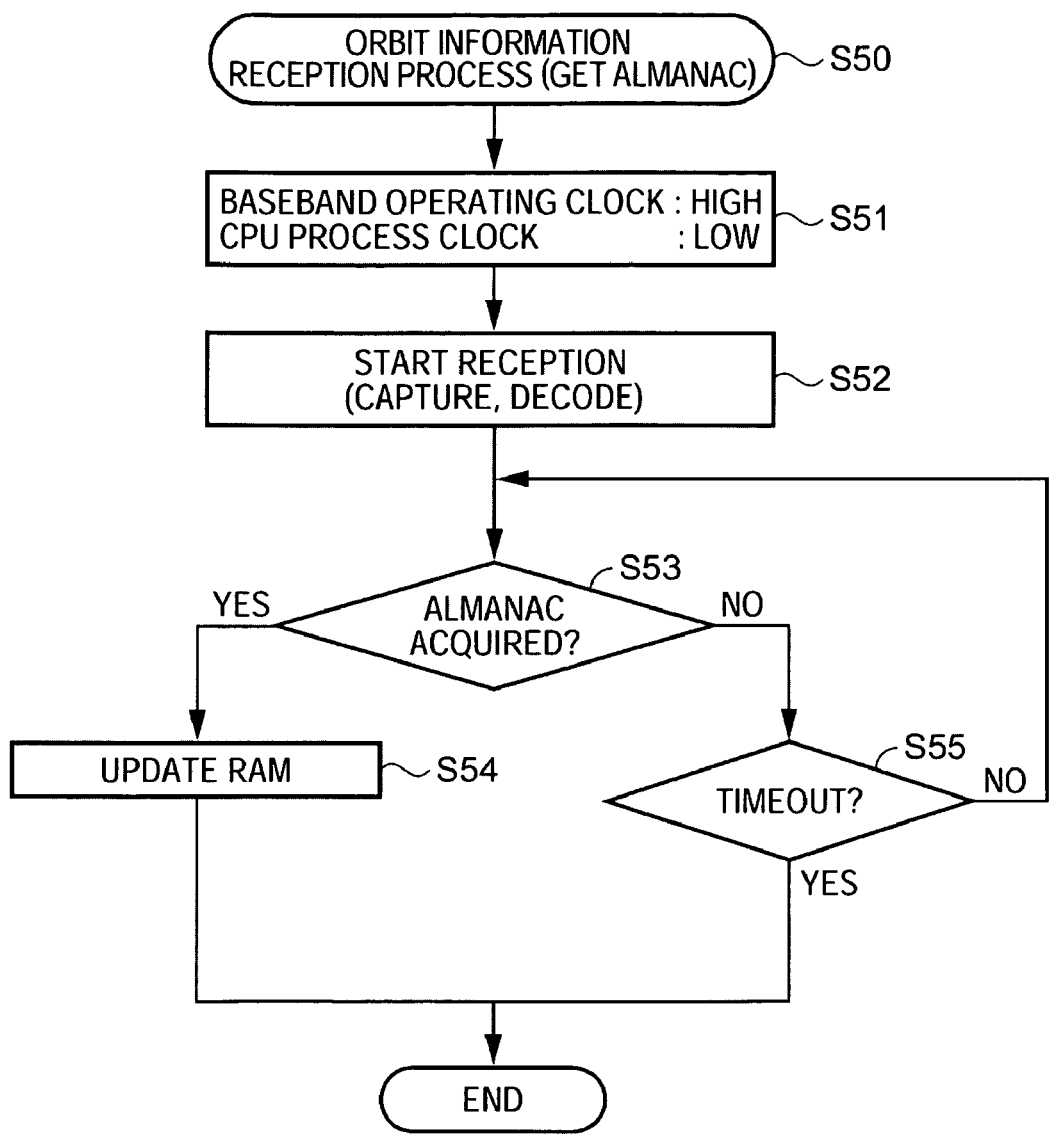
FIG. 10 is a flow chart describing the orbit information reception process of the third embodiment of the invention.

If the orbit information reception mode is detected in S31, the reception mode control unit 30 runs the orbit information reception process shown in FIG. 10 (S50).

Manual Positioning Information Reception Process

When the manual positioning information reception process S40 runs the reception mode control unit 30 sets the operating clock (baseband operating clock) of the correlation unit 132 to high speed (second operating clock) and sets the process clock (CPU clock) of the CPU 21 to high speed (second process clock) (S41) as shown in Table 3.

The correlation unit 132 and CPU 21 then operate at the clock rates set in step S41 and the satellite signal reception process starts (S42). In order to get positioning information for the GPS wristwatch 1, that is, to determine the position, the ephemeris parameters containing the precise orbit information for a particular GPS satellite 5 must be received from three to four satellites.

If ephemeris parameters are acquired from three satellites, two-dimensional positioning is possible. If ephemeris parameters are acquired from four satellites, three-dimensional positioning is possible. If the current position is needed to set the time zone, for example, two-dimensional positioning is sufficient, and it is only necessary to receive ephemeris parameters from three satellites.

As shown in FIG. 3, in order to receive the ephemeris parameters for a GPS satellite 5, the 600 bits of data from the preamble of subframe 2 must be received. The GPS satellites transmit the subframes every 30 seconds, and approximately 12 seconds is needed to receive 600 bits of data. The baseband unit 13 can search for multiple GPS satellites 5 in parallel, and can also decode the navigation data in parallel. If such parallel processing is possible, the ephemeris parameters for three to four satellites can be received in a shortest time of approximately 12 seconds, the same time required to receive ephemeris parameters for one satellite. The ephemeris parameter acquisition time is greatest, or approximately 40 seconds, when decoding starts slightly after the beginning of the ephemeris parameters in subframe 2. If signal processing takes approximately 10 seconds, then the positioning process takes approximately 40-50 seconds including this processing time if the reception conditions are good.

The CPU 21 then determines if receiving the orbit information (ephemeris parameters) and positioning are completed (S43).

If the CPU 21 determines in S43 that positioning is completed, the CPU 21 runs the positioning process based on the received orbit information and detects the current position of the GPS wristwatch 1. The CPU 21 then determines the time zone of the current location from the identified current position, corrects the time difference to the received UTC, adjusts the internal timekeeping device to the corrected time, and adjusts the time indicated by the hands 3 and the display 4 (S44). The coordinates of the current location or the time difference based on the time zone may also be displayed on the display 4 (S44).

This positioning process requires triangulation using orbit information received from three to four GPS satellites 5, and therefore requires relatively advanced, high speed processing. In the manual positioning information reception mode, therefore, the process clock of the CPU 21 is set to the high speed clock (second process clock) to complete the computations in a short time.

If the CPU 21 determines in S43 that positioning is not completed, whether the reception process timed out is determined (S45). If reception did not time out (S45 returns No), step S43 continues.

If the CPU 21 determines in step S45 that operation timed out, the reception process ends. More specifically, approximately 40-50 seconds are required under good reception conditions outdoors to complete positioning as described above. Therefore, if more time, such as approximately 100 seconds, pass but positioning has not ended, the CPU 21 determines that satellite signals cannot be received from the GPS satellites 5 and the reception process ends.

Therefore, if operation times out in S45, the CPU 21 runs a process to indicate the non-acquisition result, that is, that a signal could not be captured, and display the existing internal time (S46).

This completes processing the manual positioning information reception mode when receiving the positioning information is started manually.

Orbit Information Reception Process

When the orbit information reception process S50 runs, the reception mode control unit 30 sets the operating clock (baseband operating clock) of the correlation unit 132 to high speed (second operating clock) and sets the process clock (CPU clock) of the CPU 21 to low speed (first process clock) (S41) as shown in Table 3.

The correlation unit 132 and CPU 21 then operate at the clock rates set in step S51 and the satellite signal reception process starts to acquire the almanac parameters from a GPS satellite 5 (S52).

The CPU 21 then determines if receiving and acquiring the orbit information (almanac parameters) are completed (S53).

If acquiring the almanac is completed in S53, the CPU 21 updates the orbit information stored in RAM 41 to the received orbit information (almanac parameters) (S54), and ends the orbit information reception process.

If acquiring the almanac is not completed in S53, whether reception timed out is determined (S55). If reception did not time out (S55 returns No), step S53 continues.

If the CPU 21 determines in step S45 that operation timed out, the reception process ends. More specifically, approximately 12-15 seconds are required to acquire the entire almanac as described above. Therefore, if more time, such as 20 seconds or more, pass but acquisition has not ended, the CPU 21 determines that satellite signals cannot be received from the GPS satellites 5 and the reception process ends.

If operation has timed out in S55, the CPU 21 does not update the almanac parameters stored in RAM 41.

This completes processing the orbit information reception mode for receiving orbit information.

The effect of this embodiment of the invention is described next.

In the manual positioning information reception process receiving orbit information (ephemeris parameters) for positioning, the GPS wristwatch 1 sets the operating clock of the correlation unit 132 to a second operating clock that is faster than the first operating clock, thereby enabling receiving orbit information from three to four GPS satellites 5 in a short time.

As a result, if the manually initiates positioning information reception while wearing the GPS wristwatch 1, processing can be completed in approximately ¼ the time that would be required using the first operating clock. The GPS wristwatch 1 is therefore quickly released from the reception process state, and convenience is improved for the user when using the GPS wristwatch 1.

The CPU 21 also operates at the second process clock, which is faster than the first process clock. The positioning process, which requires relatively advanced, high speed computations, can therefore be completed in approximately ¼ the time required using the first process clock. As a result, the GPS wristwatch 1 is again quickly freed from the reception process, and convenience is improved for the use when using the GPS wristwatch 1.

However, when acquiring the almanac parameters, the operating clock of the correlation unit 132 is set to the second operating clock which is faster than the first operating clock, and a GPS satellite 5 can therefore be quickly captured and the information received. More specifically, this embodiment of the invention runs the orbit information reception process (almanac acquisition process) when the GPS wristwatch 1 is charging, and the GPS wristwatch 1 is therefore normally indoors. The strength of the satellite signals received by the GPS wristwatch 1 therefore drops. Capturing such weak signals requires executing the capture process at high speed. Because this embodiment of the invention runs the correlation unit 132 at the high speed second clock in this situation, even weak signals can be captured and probability of successful reception is improved.

In the orbit information reception mode, the CPU 21 simply decodes and stores the almanac parameters to RAM 41, and high speed computations such as required in the positioning process are not needed. This embodiment of the invention therefore drives the CPU 21 at the low speed first process clock in this situation to suppress the peak current.

As described above, the GPS wristwatch 1 according to this embodiment of the invention switches the process clock of the CPU 21 to a high speed or low speed mode according to whether the positioning process is executed or just the orbit information (almanac parameters) is acquired. This embodiment of the invention can therefore suppress the peak current, extend the battery life and reduce the battery size, and prevent system shutdowns caused by a voltage drop without lowering the success rate of the reception process.

The invention is not limited to the embodiments described above.

For example, the GPS wristwatch 1 could combine the manual reception and automatic reception modes of the first embodiment with the manual positioning reception and almanac acquisition reception modes of the third embodiment.

When the photosensor 61 and acceleration sensor 62 of the second embodiment are provided, the reception modes of the second embodiment can also be complemented by the reception modes of the third embodiment.

In addition, when the GPS wristwatch 1 controls the clock signals applied to the CPU 21 and correlation unit 132 according to the reception mode, the clocks may also be controlled with consideration for the power supply voltage or parameters that are predictive of aging, such as the number of years used, the number of charging cycles, or the number of reception cycles.

Figure 11:
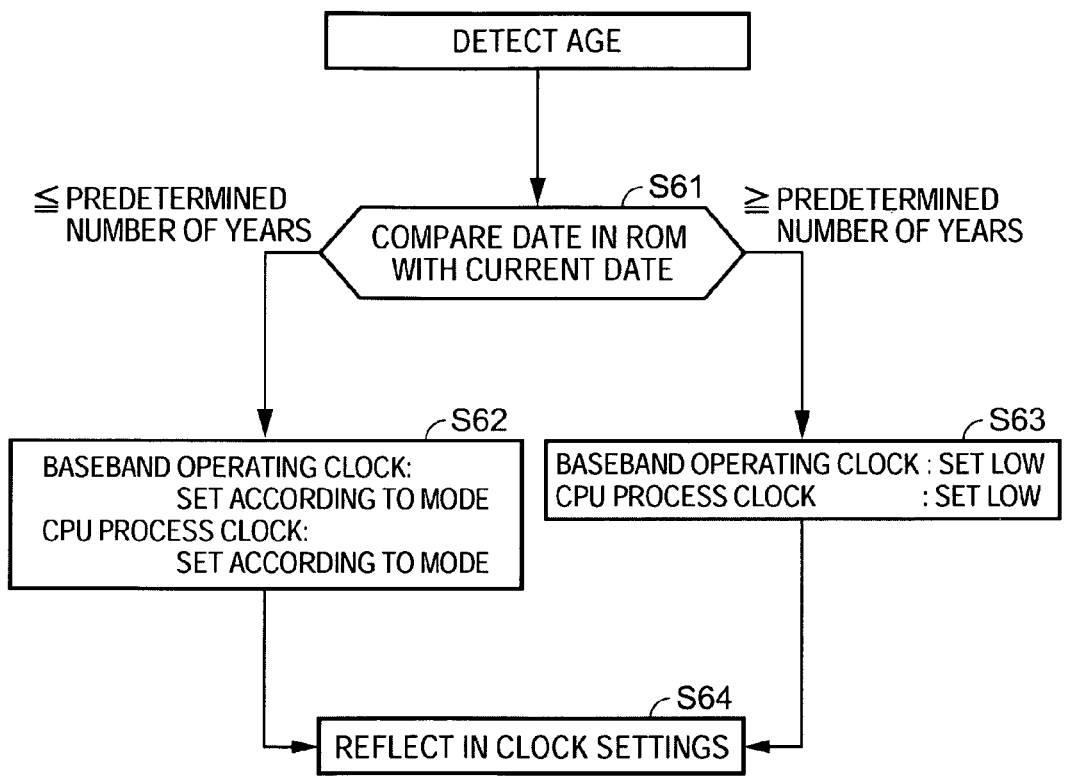
FIG. 11 is a flow chart describing a variation of the invention.

For example, the clocks may be controlled by applying an age auditing process such as shown in FIG. 11. More specifically, when instructed to receive the time information or positioning information, the CPU 21 compares the date of manufacture stored in ROM in the storage unit 40 with the current date read from the internal clock, and calculates how many years have passed, that is, the age (S61).

If the age is less than or equal to a predetermined number of years (such as 10 years), the process clock of the CPU 21 and the operating clock of the correlation unit 132 are set based on the reception mode as described above in the foregoing embodiments.

However, if the age is greater than or equal to the predetermined number of years, the process clock of the CPU 21 and the operating clock of the correlation unit 132 are set to the low speed clock (the first process clock and first operating clock) regardless of the reception mode (S63).

The clock control unit 31 then supplies the clock signals set in S62 or S63 to the CPU 21 and correlation unit 132 (S64).

When the age of the GPS wristwatch 1 exceeds the predetermined number of years, the secondary battery may have deteriorated and its charge capacity may have dropped. As a result, there is a greater possibility that the power supply voltage will drop and the system will shut down if the CPU 21 and correlation unit 132 are driven at the high clock rate.

However, by adding the process of this variation described above, the clocks are controlled to a low clock rate regardless of the reception mode if the age exceeds the predetermined limit, and the possibility of a system shutdown is reduced.

Note also that the number of charge cycles or the number of signal reception cycles may be used instead of determining the device age. More specifically, the clock can be controlled based on information that enables predicting the number of years the device has been used.

Figure 12:
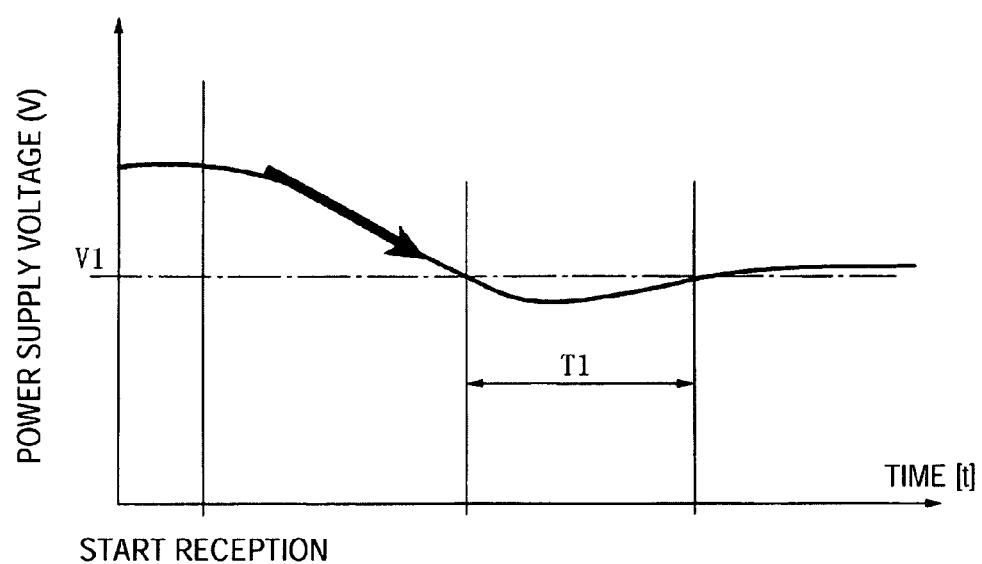
FIG. 12 is a graph showing the change in the power supply voltage in the variation of the invention.

The GPS wristwatch 1 may additionally have a voltage detector for detecting the power supply voltage. In this configuration the process clock of the CPU 21 and the operating clock of the correlation unit 132 may be set to the low speed clock (the first process clock and first operating clock) regardless of the reception mode when the detected voltage drops to or below a predetermined threshold value V1 during period T1 as shown in FIG. 12.

There is a greater possibility that the power supply voltage will drop and the system will shut down if the CPU 21 and correlation unit 132 are driven at the high clock rate when the power supply voltage is low. The possibility of a system shutdown can be reduced, however, by setting the clocks to a low clock rate when the power supply voltage is low as in this variation of the invention.

The clocks are switched between two levels, high and low, in the foregoing embodiments of the invention, but could be set to any of three or more levels.

For example, if the operating clock of the correlation unit 132 can be controlled to three levels, low, medium, and high, and the first embodiment of the invention is operating in the automatic reception mode, the signal strength of the satellite signal may be detected using the SNR, for example, and the operating clock of the correlation unit 132 set to the medium speed if the signal strength is greater than or equal to a predetermined level, and set to the high speed if less than the predetermined level.

The indoor/outdoor detection in the second embodiment described above is not limited to using a photosensor and can be determined in other ways. For example, a solar battery may be used and the indoor/outdoor determination can be based on the output power of the solar battery.

Motion detection is also not limited to an acceleration sensor or inclination sensor, and other configurations can be used instead.

The satellite signal reception device of the invention is also not limited to receiving time information and positioning information, and may receive only time information.

The satellite signal reception device of the invention is also not limited to being incorporated in a GPS wristwatch 1. The satellite signal reception device could, for example, be incorporated in a cell phone.

The foregoing embodiments are described with reference to a GPS satellite, but the invention is not limited to GPS satellites and can be used with Global Navigation Satellite Systems (GNSS) such as Galileo and GLONASS, and other positioning information satellites that transmit satellite signals containing time information, including the SBAS and other geostationary or quasi-zenith satellites.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A satellite signal reception device, comprising:
   a reception unit that captures a positioning information satellite and receives a satellite signal transmitted from the captured positioning information satellite;
   a data acquisition unit that can acquire time information and positioning information based on the satellite signal received by the reception unit; and
   a reception mode control unit that controls the reception mode of the reception unit to at least one of a time information reception mode and positioning information reception mode;
   wherein the reception unit includes a correlation unit that determines a correlation between a code used for capturing the satellite signal and the received satellite signal;
   the data acquisition unit includes an operating unit that decodes the received data; and
   the reception mode control unit includes a clock control unit that separately controls an operating clock of the correlation unit and a process clock of the operating unit according to the reception mode.

2. The satellite signal reception device described in claim 1, wherein the clock control unit is configured to
   switch the process clock of the operating unit between at least a first process clock and a second process clock that is faster than the first process clock,
   set the process clock of the operating unit to the first process clock when the time information reception mode is selected as the reception mode, and
   set the process clock of the operating unit to the second process clock when the positioning information reception mode is selected as the reception mode.

3. The satellite signal reception device described in claim 2, wherein:
the reception mode control unit is configured to select a manual time information reception mode that receives time information based on a manual operation, or an automatic time information reception mode that receives time information automatically, as the time information reception mode; and
the clock control unit is configured to
switch the operating clock of the correlation unit between at least a first operating clock and a second operating clock that is faster than the first operating clock,
set the operating clock of the correlation unit to the first operating clock and sets the process clock of the operating unit to the first process clock when the manual time information reception mode is selected as the reception mode, and
set the operating clock of the correlation unit to the second operating clock and sets the process clock of the operating unit to the first process clock when the automatic time information reception mode is selected as the reception mode.

4. The satellite signal reception device described in claim 2, wherein:
the reception mode control unit is configured to select an indoor time information reception mode for acquiring time information when indoors, a mobile time information reception mode for acquiring time information when outdoors and moving, and an outdoor stationary time information reception mode for acquiring time information when outdoors and not moving, as the time information reception mode; and
the clock control unit is configured to
switch the operating clock of the correlation unit between at least a first operating clock and a second operating clock that is faster than the first operating clock,
set the operating clock of the correlation unit to the second operating clock and sets the process clock of the operating unit to the first process clock when the indoor time information reception mode or the mobile time information reception mode is selected as the reception mode, and
set the operating clock of the correlation unit to the first operating clock and sets the process clock of the operating unit to the first process clock when the outdoor stationary time information reception mode is selected as the reception mode.

5. The satellite signal reception device described in claim 4, further comprising:
a light quantity detection unit that detects the amount of light incident to the satellite signal reception device; and
a motion detection unit that detects the acceleration or inclination angle of the satellite signal reception device;
wherein the reception mode control unit determines if the satellite signal reception device is indoors or outdoors based on the amount of light detected by the light quantity detection unit, determines if the satellite signal reception device is in motion or stationary based on change in the acceleration or inclination angle of the satellite signal reception device detected by the motion detection unit, and based on the detection results sets the time information reception mode to the indoor time information reception mode, mobile time information reception mode, or outdoor stationary time information reception mode.

6. The satellite signal reception device described in claim 1, wherein:
the reception mode control unit is configured to select as the positioning information reception mode at least a manual positioning information reception mode that receives positioning information based on a manual operation, and an orbit information reception mode that receives orbit information from a positioning information satellite; and
the clock control unit is configured to
switch the process clock of the operating unit between at least a first process clock and a second process clock that is faster than the first process clock,
switch the operating clock of the correlation unit between at least a first operating clock and a second operating clock that is faster than the first operating clock,
set the operating clock of the correlation unit to the second operating clock and sets the process clock of the operating unit to the second process clock when the manual positioning information reception mode is selected as the reception mode, and
set the operating clock of the correlation unit to the second operating clock and sets the process clock of the operating unit to the first process clock when the orbit information reception mode is selected as the reception mode.

7. A satellite signal reception device, comprising:
a reception unit that captures a positioning information satellite and receives a satellite signal transmitted from the captured positioning information satellite;
a data acquisition unit that can acquire at least time information based on the satellite signal received by the reception unit; and
a reception mode control unit that controls the reception mode of the reception unit;
wherein the reception unit includes a correlation unit that determines a correlation between a code used for capturing the satellite signal and the received satellite signal;
the data acquisition unit includes an operating unit that decodes the received data;
the reception mode control unit includes a clock control unit that is configured to
separately control an operating clock of the correlation unit and a process clock of the operating unit,
select a manual time information reception mode that receives time information based on a manual operation, or an automatic time information reception mode that receives time information automatically;
switch the process clock of the operating unit between at least a first process clock and a second process clock that is faster than the first process clock,
switch the operating clock of the correlation unit between at least a first operating clock and a second operating clock that is faster than the first operating clock,
set the operating clock of the correlation unit to the first operating clock and sets the process clock of the operating unit to the first process clock when the manual time information reception mode is selected as the reception mode, and
set the operating clock of the correlation unit to the second operating clock and sets the process clock of the operating unit to the first process clock when the automatic time information reception mode is selected as the reception mode.

8. A satellite signal reception device, comprising:
a reception unit that captures a positioning information satellite and receives a satellite signal transmitted from the captured positioning information satellite;
a data acquisition unit that can acquire at least time information based on the satellite signal received by the reception unit; and
a reception mode control unit that controls the reception mode of the reception unit;
wherein the reception unit includes a correlation unit that determines a correlation between a code used for capturing the satellite signal and the received satellite signal;
the data acquisition unit includes an operating unit that decodes the received data;
the reception mode control unit includes a clock control unit that is configured to
  separately control an operating clock of the correlation unit and a process clock of the operating unit,
  select an indoor time information reception mode for acquiring time information when indoors, a mobile time information reception mode for acquiring time information when outdoors and moving, and an outdoor stationary time information reception mode for acquiring time information when outdoors and not moving, as the time information reception mode
  switch the process clock of the operating unit between at least a first process clock and a second process clock that is faster than the first process clock,
  switch the operating clock of the correlation unit between at least a first operating clock and a second operating clock that is faster than the first operating clock,
  set the operating clock of the correlation unit to the second operating clock and sets the process clock of the operating unit to the first process clock when the indoor time information reception mode or the mobile time information reception mode is selected as the reception mode, and
  sets the operating clock of the correlation unit to the first operating clock and sets the process clock of the operating unit to the first process clock when the outdoor stationary time information reception mode is selected as the reception mode.

9. The satellite signal reception device described in claim 1, further comprising:
a voltage detector that detects the power supply voltage;
wherein the clock control unit sets the process clock of the operating unit to the first process clock and sets the operating clock of the correlation unit to the first operating clock when the voltage detected by the voltage detector is less than a threshold value.

10. The satellite signal reception device described in claim 1, further comprising:
an age detection unit that detects how many years the satellite signal reception device has been used;
wherein the clock control unit sets the process clock of the operating unit to the first process clock and sets the operating clock of the correlation unit to the first operating clock when the number of years used detected by the age detection unit is greater than or equal to a preset number of years.

11. A timekeeping device, comprising the satellite signal reception device described in claim 1, the timekeeping device further comprising:
a time information generating unit that generates internal time information;
a time information adjusting unit that corrects the internal time information; and
a time display unit that displays the internal time information;
wherein the time information adjusting unit corrects the internal time information based on the time information received in the time information reception mode.

12. A satellite signal reception method for a satellite signal reception device that includes a reception unit that captures a positioning information satellite and receives a satellite signal transmitted from the captured positioning information satellite, and includes a correlation unit that determines a correlation between a code used for capturing the satellite signal and the received satellite signal, a data acquisition unit that can acquire time information and positioning information based on the satellite signal received by the reception unit, and includes an operating unit that decodes the received data, and a reception mode control unit that controls the reception mode of the reception unit to at least one of a time information reception mode and positioning information reception mode, the satellite signal reception method comprising:
setting the reception mode;
separately controlling an operating clock of the correlation unit and a process clock of the operating unit based on the set reception mode; and
operating the correlation unit and operating unit using the controlled clock signals to receive a satellite signal.

* * * * *